(12) United States Patent
Brown et al.

(10) Patent No.: US 7,464,868 B2
(45) Date of Patent: Dec. 16, 2008

(54) COIN-DISCRIMINATOR VOUCHER ANTI-COUNTERFEITING METHOD AND APPARATUS

(75) Inventors: David J. Brown, Sammamish, WA (US); Kirk Beach, Issaquah, WA (US); Daniel A. Gerrity, Bellevue, WA (US); Steven Geiger, Stanwood, WA (US); Timothy Manion, Seattle, WA (US); Scott Scherer, San Francisco, CA (US)

(73) Assignee: Coinstar, Inc., Bellevue, WA (US)

( * ) Notice: Subject to any disclaimer, the term of this patent is extended or adjusted under 35 U.S.C. 154(b) by 0 days.

(21) Appl. No.: 10/894,358

(22) Filed: Jul. 19, 2004
(Under 37 CFR 1.47)

(65) Prior Publication Data

US 2005/0121507 A1    Jun. 9, 2005

Related U.S. Application Data

(63) Continuation of application No. 10/653,699, filed on Sep. 2, 2003, now abandoned.

(51) Int. Cl.
*G06K 15/00* (2006.01)

(52) U.S. Cl. .................. 235/383; 235/379; 235/381; 283/70; 283/72; 283/902

(58) Field of Classification Search ............. 235/7 R, 235/381, 425, 383, 379, 380; 902/11; 194/216, 194/217; 283/113

See application file for complete search history.

(56) References Cited

U.S. PATENT DOCUMENTS

| | | | |
|---|---|---|---|
| 3,048,251 | A | 8/1962 | Bower |
| 4,059,122 | A | 11/1977 | Kinoshita et al. |
| 4,210,346 | A | 7/1980 | Mowry, Jr. et al. |
| 4,425,161 | A | 1/1984 | Shibahashi et al. |
| 4,436,103 | A | 3/1984 | Dick |
| 4,447,714 | A | 5/1984 | Lundblad et al. |

(Continued)

FOREIGN PATENT DOCUMENTS

CA    2348921    5/2000

(Continued)

OTHER PUBLICATIONS

Search Report, GB Application No. 9925225.6, Mar. 20, 2000, 4 pages.

(Continued)

*Primary Examiner*—Uyen-Chau N Le
(74) *Attorney, Agent, or Firm*—Perkins Coie LLP

(57) ABSTRACT

Vouchers and methods for providing vouchers configured to assist in distinguishing unauthorized duplicate or counterfeit vouchers are disclosed herein. In one embodiment, a voucher can include a substrate, a first indicia on the substrate, and a thermally responsive second indicia on the substrate. At least one of the first indicia and the second indicia can indicate a value of the voucher. A system which assists in detecting alteration of value documents or transmissions, such as a coin counter voucher is provided. Voucher information such as the voucher value is included in the voucher in an encrypted or otherwise modified form. When the voucher is presented for redemptions, the encrypted information is decrypted and compared to independently available voucher information. Failure of the information to match indicates that the voucher has been altered or should otherwise be further checked.

32 Claims, 9 Drawing Sheets

U.S. PATENT DOCUMENTS

| | | | |
|---|---|---|---|
| 4,706,795 A | | 11/1987 | Mikami et al. |
| 4,757,537 A | | 7/1988 | Edelmann et al. |
| 4,854,332 A | | 8/1989 | Hanakura |
| 4,880,964 A | * | 11/1989 | Donahue ............ 235/488 |
| 4,977,502 A | | 12/1990 | Baker et al. |
| 4,995,848 A | | 2/1991 | Goh et al. |
| 5,001,753 A | | 3/1991 | Davio et al. |
| 5,002,313 A | | 3/1991 | Salvatore |
| 5,003,596 A | | 3/1991 | Wood |
| 5,003,597 A | | 3/1991 | Merkle |
| 5,055,657 A | | 10/1991 | Miller et al. |
| 5,083,815 A | | 1/1992 | Scrymgeour et al. |
| 5,137,304 A | | 8/1992 | Silverschotz et al. |
| 5,189,007 A | | 2/1993 | Aihara et al. |
| 5,226,519 A | | 7/1993 | DeWoolfson |
| 5,252,811 A | | 10/1993 | Henochowicz et al. |
| 5,259,906 A | * | 11/1993 | Poplawski et al. ........ 156/252 |
| 5,282,651 A | | 2/1994 | Alonso |
| 5,344,191 A | | 9/1994 | Chang et al. |
| 5,375,271 A | | 12/1994 | Frankel |
| 5,413,384 A | | 5/1995 | Principe et al. |
| 5,466,012 A | | 11/1995 | Puckett et al. |
| 5,483,363 A | | 1/1996 | Holmes et al. |
| 5,509,692 A | * | 4/1996 | Oz ............ 283/70 |
| 5,564,546 A | * | 10/1996 | Molbak et al. .......... 194/216 |
| 5,570,123 A | | 10/1996 | Almonte |
| 5,598,477 A | | 1/1997 | Berson |
| 5,618,063 A | | 4/1997 | Chang et al. |
| 5,620,079 A | * | 4/1997 | Molbak ............ 194/217 |
| 5,679,070 A | | 10/1997 | Ishida et al. |
| 5,704,651 A | | 1/1998 | Phillips |
| 5,742,685 A | | 4/1998 | Berson et al. |
| 5,765,141 A | | 6/1998 | Spector |
| 5,785,171 A | | 7/1998 | Howes |
| 5,789,050 A | | 8/1998 | Kang |
| 5,799,767 A | * | 9/1998 | Molbak ............ 194/217 |
| 5,810,397 A | | 9/1998 | Mehta et al. |
| 5,826,915 A | | 10/1998 | Gregory, Jr. |
| 5,835,689 A | | 11/1998 | Braun et al. |
| 5,868,432 A | * | 2/1999 | Mantegazza ............ 283/94 |
| 5,909,793 A | | 6/1999 | Beach et al. |
| 5,917,996 A | | 6/1999 | Thorpe |
| 5,936,541 A | | 8/1999 | Stambler |
| 5,943,423 A | | 8/1999 | Muftic |
| 5,970,875 A | | 10/1999 | Hoffmann et al. |
| 5,995,942 A | | 11/1999 | Smith et al. |
| 6,056,289 A | | 5/2000 | Clapper, Jr. |
| 6,080,056 A | * | 6/2000 | Karlsson ............ 453/3 |
| 6,089,614 A | * | 7/2000 | Howland et al. ............ 283/91 |
| 6,110,044 A | | 8/2000 | Stern |
| 6,116,402 A | * | 9/2000 | Beach et al. ............ 194/216 |
| 6,138,106 A | | 10/2000 | Walker et al. |
| 6,193,155 B1 | | 2/2001 | Walker et al. |
| 6,233,340 B1 | | 5/2001 | Sandru et al. |
| 6,269,349 B1 | | 7/2001 | Aieta et al. |
| 6,318,536 B1 | * | 11/2001 | Korman et al. ............ 194/217 |
| 6,349,972 B1 | * | 2/2002 | Geiger et al. ............ 283/113 |
| 6,375,080 B1 | * | 4/2002 | Cremonese ............ 235/487 |
| 6,413,305 B1 | | 7/2002 | Mehta et al. |
| 6,494,776 B1 | * | 12/2002 | Molbak ............ 453/32 |
| 6,644,696 B2 | * | 11/2003 | Brown et al. ............ 283/113 |
| 6,736,725 B2 | | 5/2004 | Burns et al. |
| 6,969,549 B1 | * | 11/2005 | Zamani-Kord et al. ... 428/195.1 |
| 6,976,570 B2 | | 12/2005 | Molbak |
| 7,028,827 B1 | | 4/2006 | Molbak et al. |
| 7,344,160 B2 | | 3/2008 | Geiger et al. |
| 2002/0112162 A1 | | 8/2002 | Cocotis et al. |
| 2003/0205896 A1 | | 11/2003 | Geiger et al. |

FOREIGN PATENT DOCUMENTS

| | | |
|---|---|---|
| EP | 0 351 217 A2 | 1/1990 |
| EP | 1127593 A1 | 8/2001 |
| GB | 2123591 A | 2/1984 |
| GB | 2 271 456 A | 4/1994 |
| GB | 2326866 A | 1/1999 |
| JP | 10-236046 | 9/1998 |
| SE | 8702325 | 8/1988 |
| SE | 8801851 | 11/1989 |
| WO | WO 95/30215 A1 | 11/1995 |
| WO | WO97/30409 | 8/1997 |
| WO | WO-98/26962 | 6/1998 |
| WO | WO-98/43149 | 10/1998 |

OTHER PUBLICATIONS

International Search Report, International Application No. PCT/US02/26245, Dec. 9, 2002, 3 pages.
Supplementary European Search Report, EP Application No. 99955153, Oct. 31, 2003, 3 pages.
Civil Docket for Case #: 3:06-cv-00299; *Coinstar, Inc.* v. *Coinxchange, LLC*; U.S. District Court, Eastern District of Virginia (Richmond); 10 pages.
Complaint for Patent Infringement; Filed May 2, 2006; Civil Case No. 3:06-cv-00299; United States District Court, Eastern District of Virginia, Alexandria Division; 89 pages.
Defendant's Answer and Counterclaims to Plaintiff's Complaint for Patent Infringement; Filed May 30, 2006; Civil Case No. 3:06-cv-00299; United States District Court, Eastern District of Virginia, Richmond Division, 13 pages.
Cummins-Allison Corporation's Answer to Third-Party Complaint of Coin X Change; Filed Jun. 30, 2006; Civil Case No. 3:06-cv-00299; United States District Court, Eastern District of Virginia, Richmond Division; 17 pages.
Stipulation Dismissing '402 and '972 Patents; Entered Nov. 3, 2006; Civil Case No. 3:06-cv-00299; United States District Court, Eastern District of Virginia, Richmond Division; 2 pages.
Defendant's Prior Art Statement; Filed Nov. 14, 2006; Civil Case No. 3:06-cv-00299; United States District Court, Eastern District of Virginia, Richmond Division; 75 pages.
Scan Coin Technical Referens [sic] Manual, CDS, 1989, 47 pages.
Scan Coin User's Manual, CDS 600, 1991, 14 pages.
Technical Manual, Cash Deposit System, Model CDS 600 & CDS 640, 1991, 46 pages.
"Kunderna fixar vaxeln," Praktiska, 2 pages.
Leitch, C., "High-tech bank counts coin," Report on Business, The Globe and Mail, Sep. 18, 1991, 1 page.
Llemeon, J., "Royal's Burlington drive-in bank provides customers 24-hour tellers," The Toronto Star, Aug. 21, 1991, 1 page.
Oxby, M., "Royal Bank opens 'super branch'," The Gazette Montreal, Sep. 14, 1991, 1 page.
Svenska Penninglotteriet Documents, 1988, 46 pages.
Fri Kopenskap articles, Mar. 18, 1988, Apr. 27, 1989 and Nov. 25, 1988, 4 pages.
Priab Prisma article, 1989, 7 pages.
Scan Coin CDS Cash Deposit System, Brochure, Sep. 1988, 6 pages.
Scan Coin CDS Mini Cash Deposit System, Brochure, Undated, 2 pages.
Scan Coin 102 Value Counter, Brochure, Undated, 2 pages.
Scan Coin CDS 600 Cash Deposit System, Brochure, Undated, 2 pages.
U.S. Appl. No. 11/782,349, filed Jul. 24, 2007, Geiger et al.
U.S. Appl. No. 11/931,248, filed Oct. 31, 2007, Geiger et al.
Office Action; U.S. Appl. No. 09/960,599; Mailed on Oct. 23, 2002; 9 pgs.
Office Action; U.S. Appl. No. 09/960,599; Mailed on Feb. 28, 2003; 8 pgs.
Office Action; U.S. Appl. No. 09/960,599; Mailed on Jul. 29, 2003; 9 pgs.
Office Action; U.S. Appl. No. 09/960,599; Mailed on Jan. 28, 2004; 10 pgs.

Office Action; U.S. Appl. No. 09/960,599; Mailed on Jun. 6, 2006; 7 pgs.

Office Action; U.S. Appl. No. 09/960,599; Mailed on Jan. 30, 2007; 8 pgs.

Notice of Allowance; U.S. Appl. No. 09/960,599; Mailed on Jun. 11, 2007; 5 pgs.

Notice of Allowance; U.S. Appl. No. 09/960,599; Mailed on Dec. 13, 2007; 8 pgs.

Notice of Allowance; U.S. Appl. No. 09/960,599; Mailed on Jan. 15, 2008; 5 pgs.

Non-Final Office Action; U.S. Appl. No. 11/782,349; Mailed on Jun. 17, 2008; 12 pages.

U.S. Appl. No. 12/172,851, filed Jul. 14, 2008, Brown.

Non-Final Office Action; U.S. Appl. No. 11/931,248; Mailed on May 30, 2008; 9 pages.

* cited by examiner

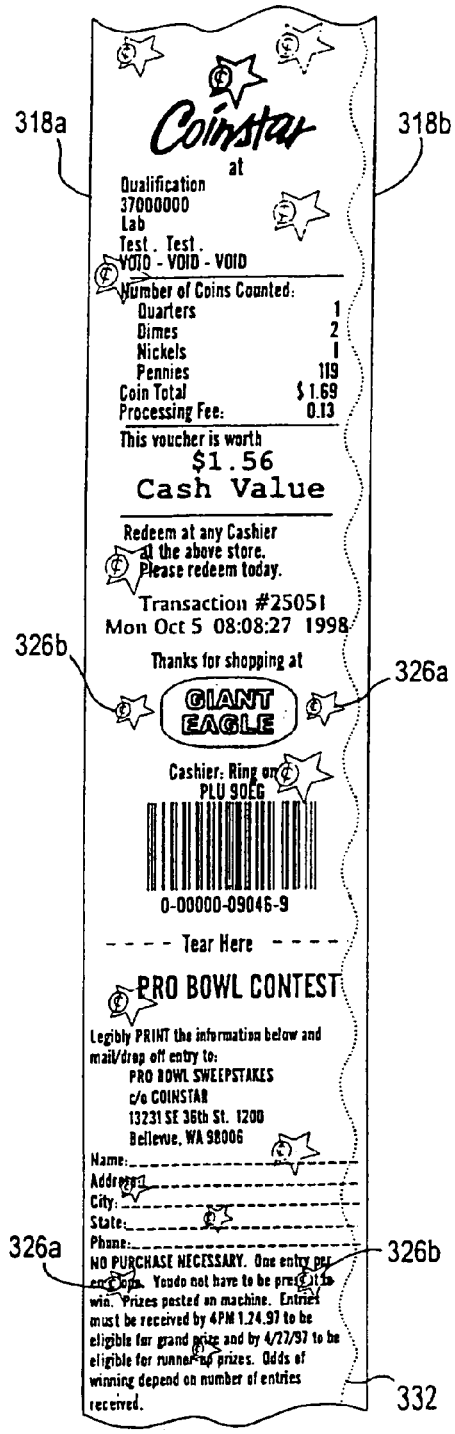
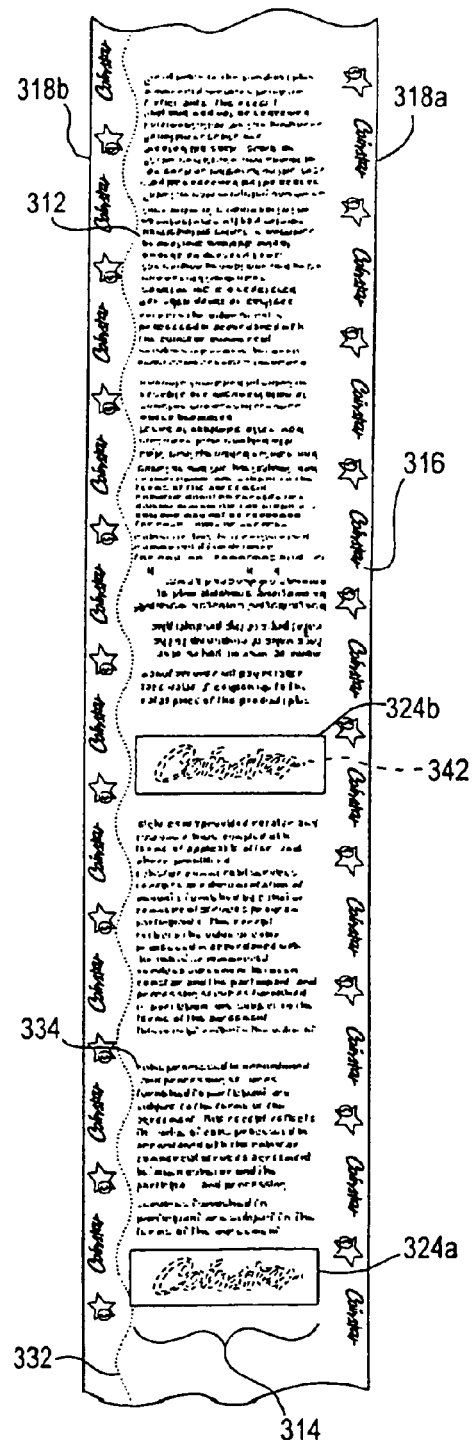
FIG. 3A
FIG. 3B

COIN-DISCRIMINATOR VOUCHER ANTI-COUNTERFEITING METHOD AND APPARATUS

CROSS-REFERENCE TO RELATED APPLICATION(S)

This application is a continuation of U.S. patent application Ser. No. 10/653,699, filed Sep. 2, 2003, which is a divisional of U.S. patent application Ser. No. 10/039,181, filed Jan. 5, 2002, now U.S. Pat. No. 6,644,696, which is a continuation-in-part of U.S. patent application Ser. No. 09/422,917, filed Oct. 21, 1999, now U.S. Pat. No. 6,349,972, which claims priority to U.S. Provisional Patent Application No. 60/105,508, filed Oct. 23, 1998. Cross-reference is made to U.S. patent application Ser. No. 09/035,273, filed Mar. 8, 1998, which is a continuing application claiming priority from U.S. patent application Ser. No. 08/237,486, filed May 3, 1994 (now U.S. Pat. No. 5,620,079), which is a continuation-in-part of U.S. patent application Ser. No. 07/940,931, filed Sep. 4, 1992, which is the parent of U.S. patent application Ser. No. 08/255,539, filed Jun. 6, 1994 (now U.S. Pat. No. 5,564,546). Cross-reference is further made to U.S. patent application Ser. No. 09/178,441 for "Voucher Coding for Self-Service Coin Discriminator," filed on Oct. 23, 1998 (now U.S. Pat. No. 6,116,402), and to PCT/US97/11174, filed Jun. 27, 1997 for "Coin Discrimination Apparatus and Method," all of which are incorporated herein by reference.

Cross-reference is made to U.S. application Ser. No. 08/883,780, filed Jun. 27, 1997, and to U.S. application Ser. No. 08/689,826, filed Aug. 12, 1996 for "Coin Counter/Sorter and Coupon/Voucher Dispensing Machine and Method," which is a continuation of U.S. application Ser. No. 08/255,539, filed Jun. 6, 1994, which is a continuing application of U.S. application Ser. No. 07/940,931, filed Sep. 4, 1992, all of which are incorporated herein by reference.

TECHNICAL FIELD

The present invention relates to the provision of vouchers in connection with a coin-discriminator and/or counter and in particular ways of deterring, reducing, eliminating or detecting unauthorized duplication or counterfeiting of vouchers.

BACKGROUND

At least some types of coin-discriminators are configured to receive a plurality of coins of various denominations, e.g., from untrained users (such as grocery store or other retail location customers), typically including non-coin items and/or foreign or other undesired coins, to discriminate the various denominations of the desired coins (possibly after separating non-coin items and/or undesired coins) to determine the value of the discriminated desired coins, and to output an indication of the value of the total amount of the discriminated, desired coins. Although many forms of such value output may be termed a voucher, including paperless output (such as depositing a value in a user's bank account, e.g., after reading a user's bank card or other identifier), the present invention is particularly directed to devices which include apparatus or procedures for outputting a physical voucher such as a paper voucher with indicia indicating a value related to the total amount of discriminated, desired coins. Although such physical vouchers will be discussed as "paper" voucher hereinbelow, its possible to provide physical vouchers in other forms such as with indicia placed on other substrates such as plastic, cardboard, magnetic or other non-visible information-bearing media and the like.

Because a physical or "paper" voucher has value, in the sense that it can be redeemed for, e.g., cash or credit, it is important for the redeemer to have confidence that a voucher which is presented for redemption is genuine, i.e., is not an unauthorized duplicate or counterfeit voucher. Verifying the genuineness of a voucher is especially difficult in the face of sophisticated image production, reproduction or manipulation technologies such as color photocopy technology, color scanning technologies, computer-based printing technologies such as inkjet (including color inkjet) or laser (including color laser) printer, e.g., coupled to personal computers, work stations and the like. Accordingly, it would be useful to provide vouchers whose genuineness can be readily determined, as compared to an unauthorized duplicate or counterfeit voucher, e.g., produced using such image duplication production, reproduction or manipulation technologies.

Some approaches to detecting unauthorized duplication or counterfeiting have involved encrypting certain information which is then printed on the voucher as part of the voucher printing procedure such that decryption provides a level of confidence that the voucher is genuine. Although such encryption/decryption procedures can be quite useful (and indeed, can, if desired, be used in combination with some or all features of the present invention), there are circumstances in which it may be desirable to provide for other counterfeit detection measures, in addition to or in place of such encryption/decryption measures.

In some circumstances, it may be desirable to provide anti-counterfeit measures or devices which are independent of the need for substantial modification of printing, check-out or verification software (of the type that might be used in connection with encryption/decryption). For example, it may be desired to avoid making modifications to printing software and/or to avoid modifying or providing software for decryption. Furthermore, in some circumstances it may be desired to avoid the personnel training or hardware involved in a decryption verification process. For example, in some circumstances it is desirable to permit the voucher redemption (which may typically occur at a grocery store or other retail location check-out stand) to be performed, in whole or in part, based on a visual inspection of the voucher (e.g., without the need to perform a decryption step). In some circumstances it may be desirable to provide for duplicate/counterfeit detection without the need for using a computer or other equipment.

Many self-service coin-discriminators of a type with which the present invention may be used employ a thermal printer for outputting a paper voucher. Thermal printers can be particularly useful because of the lack of a requirement to replenish ink or toner. Thermal printers typically operate in conjunction with a type of paper specific to thermal printing ("thermal paper"). Thermal paper often has characteristics which limit how the paper may be treated (e.g., limiting the types of ink or other materials that may be used in connection with providing, for example background preprinting, watermarks and the like). Accordingly, it would be useful to provide voucher duplication/counterfeiting detection or prevention which can be reasonably and feasibly used with thermal papers and/or thermal printers (e.g., without incurring relatively high costs).

Although there are benefits to an anti-counterfeiting system which provides for detection of unauthorized duplications or counterfeits (at least in part) using a visual inspection of the voucher, a system in which all anti-counterfeiting features are features which are normally visible also means that potential counterfeiters can determine what features need to be copied or duplicated by performing a visual inspection of a valid voucher. Accordingly, it would be useful, in some embodiments, to provide at least some anti-counterfeiting features which are not normally visible, i.e., which are not visible in ordinary ambient light of a redemption location.

Because, in at least some systems, voucher redemption is performed at a retail location, such as during ordinary retail purchase "check out", it would be useful to provide anti-counterfeiting procedures or devices which can be performed relatively rapidly so as to avoid checkout line delays. For example, it would be useful if some or all anti-counterfeiting features can be used for verification without the need for special positioning or manipulation of a voucher and/or without the need for manually inputting features or information from the voucher and preferably without the need to provide special equipment for voucher verification at checkout locations.

In situations where coin-discriminators are already being used, it would be useful to provide for voucher anti-counterfeiting measures which include features that can be provided with little or no modification of coin-discriminator hardware and/or retail location check-out hardware. In some embodiments, it would be useful to provide at least some anti-counterfeiting features which can be implemented by loading paper into already-existing coin-discriminators and substantially without modification of coin-discriminator hardware.

As described in U.S. Pat. No. 4,620,079 (incorporated herein by reference) a coin counter discriminator may be provided which receives and counts a plurality of coins and outputs a voucher, i.e., an output which itself has a value, related to the value of the arbitrary number of multi-denominated counted coins, and which may be redeemed or exchanged for such value. In at least one application of a coin counter/discriminator, a number of such discriminators are positioned at retail locations and are configured to facilitate use by untrained users, particularly, ordinary untrained customers (as opposed to, e.g., employees) of the retain locations. Such users typically bring jars or other containers having a plurality of coins to the machine and dump the coins into a coin receiving region or area, in a random, jumbled mass, i.e., in an unoriented fashion, with the coins typically being of a plurality of different denominations, and often including non-coin items (paper items, lint, keys, screws, washers and the like) and/or foreign or other non-acceptable or undesirable coins. The machine is configured to discriminate and/or separate acceptable or desirable coins from other objects and also to discriminate one denomination of coin from another. The acceptable coins are counted, preferably by denomination, and a total of acceptable coins or a total value of acceptable coins is determined in this manner. The acceptable coins are retained, e.g., in a bin or bag within the discriminator and non-coin objects, unacceptable coins or undiscriminable objects are treated as waste and/or returned to the user.

Although there is no theoretical reason why such a coin discriminator could not be configured to output government-issued paper currency ("cash") in response to at least some of the counted and retained acceptable coins, in at least one embodiment it is preferred to output a voucher which includes written and/or encoded indicia which indicates, at least indirectly, information including the value which the voucher has. The value of the voucher is not necessarily equal to the "face value" of the counted acceptable coins. In one embodiment, the value of the voucher will be equal to the value of the counted coins minus a fee charged for the counting service. The fee may be calculated in a number of fashions such as a flat fee, a fee based on the number of coins counted, a fee which takes into consideration the types or denominations of the coins counted, a fee which is a percentage of the value or a weighted percentage based on type or denomination of coins, and the like. It would also be possible to provide a configuration in which the value of the voucher exceeded the face value of the counted coins, e.g., as a promotion to encourage use of the machine for a limited period or to take into account coins which have an actual value exceeding the face value (e.g., recognized rare or otherwise valuable coins) and the like.

Although, in at least one configuration, a voucher is in the form of a paper slip printed with certain information, as described more fully below, the voucher may also take other forms including digital or electronic codes recorded on or transferred to a magnetic card, a smart card, transferred to a bank account or other account, e.g., over a preferably encrypted or otherwise secure telephone or other communication link, transferred to a computer such as a retail location "back room" computer or other computer (e.g., to credit a user's account or provide a credit against purchases and the like).

After the voucher is output, in at least some systems a user will use or obtain the value of the voucher, e.g., by redeeming the voucher it is anticipated that, typically, a user such as a retail customer will present the voucher to a retail cashier (e.g., the cashier at a grocery store checkout location), often as part of a purchase transaction, the retail cashier will redeem the voucher by paying the voucher in cash or by providing a credit for the amount of the voucher against purchases made by the customer.

In this regard, it can be seen that the voucher itself is treated as having value and accordingly, there is a potential for unscrupulous individuals to obtain or devise a counterfeit, duplicate or altered voucher in order to obtain value to which they are not entitled. For example, some individuals may attempt to make one or more photocopies, or otherwise duplicate a voucher and present it for redemption. Some individuals may attempt to counterfeit an entire voucher, such as by drafting or composing an image of a voucher. Some individuals may alter a legitimate voucher (or an image of a legitimate voucher), e.g., changing the amount or value indicated or encoded on or in the voucher. Accordingly, it would be useful to provide a system which assists in detecting duplicate, counterfeit or altered vouchers.

In a number of situations, it is desired to provide for relatively rapid redemption or other processing of presented vouchers, in order to avoid customer ill will or excessive employee time that could be the result of excessively-long voucher processing. In a number of situations, voucher processing is facilitated with the use of store checkout equipment such as checkout (point-of-sale or "POS") computers, scanners and the like. However, modifications of such equipment to provide for additional functions can involve additional programming time, can increase execution or processing time, can involve additional programming time, can increase execution or processing time, can impose extra computing burden on processors in such systems and may require linking the POS system to an external system, thus involving additional hardware and requiring extensing programming and/or system configuration. Accordingly, it would be advantageous to provide a system for detecting duplicate, counterfeit, or alternate vouchers which can achieve rapid voucher processing without undue burden on existing computer, scanning or other equipment at retail locations.

In many retail locations, checkout equipment includes the capability of bar code scanning, e.g., for identifying merchandise. Typically, the associated software is configured to recognize bar codes according to a standard bar code system such as a system promulgated by the Uniform Code Council Inc. of Dayton, Ohio. Accordingly, it would be useful to provide a system for detecting counterfeit, duplicate or altered vouchers which was at least partially (preferably, fully) compatible with a standard bar code system.

SUMMARY

Embodiments of the present invention include one or more features provided in or on paper (or other substrate) used for printing a voucher. In one embodiment, at least some portions of the paper are pre-printed or otherwise (pre-provided (i.e., printed or provided prior to the printing or providing of indicia indicating the value of the voucher) in ink which is not readily reproducible by ordinary color photocopiers, such as certain fluorescent inks. In one embodiment, the paper (or other substrate) is provided with a plurality of perforations in a pattern which is not readily reproducible such as a pattern including curved or otherwise non-linear patterns of perforation preferably with the perforations being relatively small and closely spaced and the pattern defining relatively tight-radiused but preferably substantially continuous curves.

In one embodiment, the voucher is provided with printing on both surfaces which are registered relative to one another in such a fashion that the registration may be readily verified (e.g., by holding the voucher up to a light or otherwise backlighting a voucher so as to view at least some portions of printing on the two surfaces simultaneously). In some embodiments, portions of the voucher are printed with a material which has relatively low visibility, or is substantially invisible, until such portion is treated or manipulated, e.g., such as by rubbing or scratching with a coin or other object.

At least two or more anti-counterfeiting features of a voucher can be verified by viewing only one surface of the voucher, i.e., without the need to flip the voucher over to view the opposite side.

In some embodiments, some or all features are features which permit voucher verification using only visual inspection of the voucher, i.e., without the need to use any equipment. In other embodiments, at least one feature is a feature which is not readily apparent in ordinary or typical light (so as to render it difficult for a potential counterfeiter to even be aware of, much less to duplicate, such feature) such as providing markings which fluoresce or otherwise have detectable properties when viewed in specific types of light such as ultraviolet light.

In some embodiments, the voucher paper is preprinted or preprovided with indicia which are oriented in different fashions (such as both vertically and horizontally) and/or are positioned near the edge of the paper or are otherwise oriented or positioned in a fashion which may be difficult to duplicate with typical computer-based printers.

According to one embodiment, a voucher includes information usable for ascertaining the validity of a voucher, but which is provided preferably in an altered form such as being permuted, shifted, encrypted or the like. In this way, a person who alters a voucher, such as by changing the printed or displayed amount, cannot avoid detection of the alteration without also knowing how to permute, shift, encode, etc., the information used for validation. Preferably, any permutation, shifting, encryption or the like which is used is of a nature that once the procedure for reversing the permutation, shifting or other encryption is known, execution of the reverse processes (e.g., reverse shifting, decryption), can be performed relatively easily (e.g., automatically, by a computer) so as to impose relatively minor computing or time burdens on the validation process.

Unless otherwise indicated, encryption refers generally to altering the form or appearance of information (preferably so as to prevent at least the casual viewer/reader from understanding the information) in such a way that it may be manipulated to recover the original information but such that it is not readily apparent, from the altered information, how the altered information is related to the original information. Encryption, in this sense, includes, but is not limited to, permuting digits or characters of a field, adding, subtracting, multiplying or dividing (to or by) key values, performing binary operations on digital fields, performing operations on concatenated fields and the like.

In one embodiment, a voucher includes a printed, human-readable indication of an amount, and, preferably includes a transaction number or other identifier number. An encoded version of the amount, transaction number, transaction date, expiration date, retail location, or combination(s) thereof is also printed or encoded, preferably as at least part of a bar code (to facilitate validation and redemption). When the voucher is presented, the bar code or other encoded number is decrypted or otherwise processed to recover the value and transaction number. The value and/or transaction number can then be used as part of a validation process such as by comparing the recovered encoded value to the printed value or transaction number and/or checking the transaction number or the like against a negative checklist (i.e., a list of transaction numbers which have already been redeemed or are otherwise suspect). Vouchers which are not validated can be refused payment or can be more closely inspected or provided with an identification process, such as recording the customer's driver's license number, getting manager approval, and the like.

A number of systems can be used for altering or encoding values, transaction numbers or combinations. Two basic (not necessarily exhaustive) classes of encryption include using a not-generally-known algorithm, and a known key, and using a not-generally known key with a known algorithm. In one embodiment, one or more tables are used, e.g., to control digi shifting and/or digit or value addition/subtraction. By basing such processes on tables, time and computing burdens are reduced (as compared with, e.g., more computationally burdensome processes such as standard encryption/decryption) and it becomes relatively straightforward to change the alteration system (e.g., by downloading one or more new value tables). Other types of manipulation can be used such as digital/binary conversions and the like. In this way, many types of voucher alterations or fabrications become apparent upon an attempted redemption and monetary losses attributable to such alterations or fabrications are reduced or eliminated.

BRIEF DESCRIPTION OF THE DRAWINGS

FIG. 3A is a front view of a voucher of a type which may be used according to one embodiment of the present invention;

FIG. 3B is a view of the back surface of the voucher of FIG. 3A with FIG. 3B being positioned in alignment with FIG. 3A to show relative locations of features on opposite surfaces;

DETAILED DESCRIPTION

Figure 1:
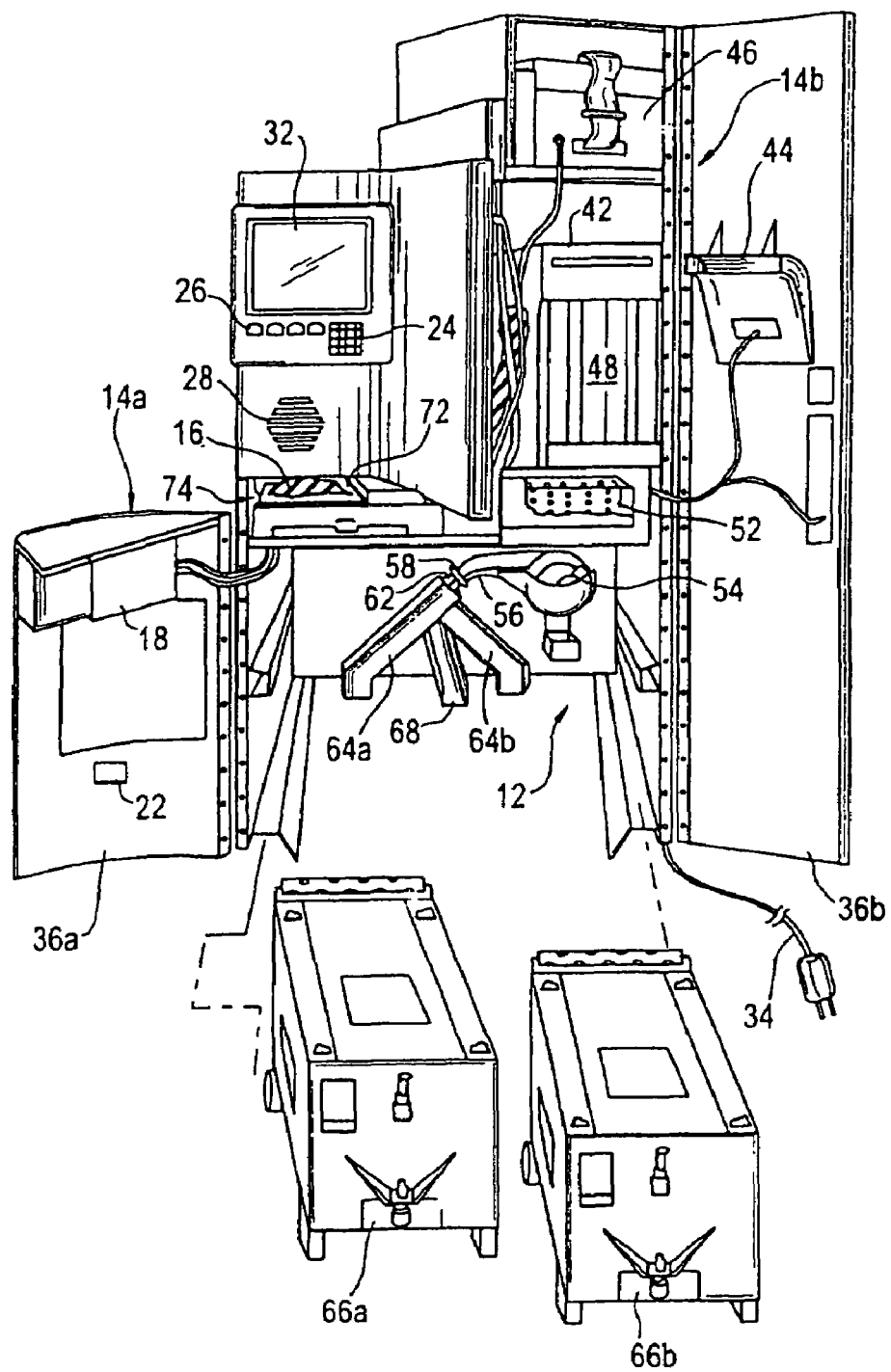
FIG. 1 is a perspective view of a coin-discriminating device, in an opened configuration, of a type which may be used in at least one implementation of the present invention.

FIG. 1 is perspective view of a coin-discriminator of a type which can be used in connection with embodiments of the present invention. The embodiment depicted in FIG. 1 generally includes a coin counting/sorting portion 12, a voucher dispensing portion 14a and a coupon dispensing portion 14b. In the depicted embodiment, the coin counting portion 12 includes an input tray 16, a coin return region 22, and customer I/O devices, including a keyboard 24, additional keys 26, a speaker 28 and a video screen 32. The apparatus can include various indicia, signs, displays, advertisement and the like on its external surfaces. A power cord 34 provides power to the mechanism.

Preferably, when the doors 36a, 36b are in the open position as shown, most or all of the components are accessible for cleaning and/or maintenance. In the depicted embodiment, a voucher printer 18 is mounted on the inside of the door 36a. A number of printers can be used for this purpose. In one embodiment, a model KLDS0503 printer, available from Axiohm is used. The right-hand portion of the cabinet includes a coupon feeder 42 for dispensing, e.g., pre-printed manufacturer coupon sheets through a chute 44 to a coupon hopper on the outside portion of the door 36b. A computer 46, in the depicted embodiment, is positioned at the top of the right hand portion of the cabinet in order to provide a relatively clean, location for the computer. An I/O board 48 is positioned adjacent the sheet feeder 42.

The general coin path for the embodiment depicted in FIG. 1 is from the input tray 16, doves first and second chutes to a trommel 52, to a coin pickup assembly 54, along a coin rail 56 and past a sensor 58. If, based on sensor data, it is determined that the coin can and should be accepted, a controllable deflector door 62 is activated to divert coins from their gravitational path to coin tubes 64a. b for delivery to coin trolleys 66a, b. If it has not been determined that a coin can and should be accepted, the door 62 is not activated and coins (or other objects) continue down their gravitational or default path to a reject chute 68 for delivery to a customer-accessible reject or return box 22.

In use, a user is provided with instructions such as on computer screen 32. The user places a mass of coins, typically of a plurality of denominations (typically accompanied by dirt or other non-coin objects) in the input tray 16. The user is prompted to push a button to inform the machine that the user wishes to have coins discriminated. Thereupon, the computer causes an input gate (not shown) to open and provides a signal to prompt the user to begin feeding coins When the gate is open, a motor is activated to begin rotating the trommel assembly 52. The user moves coins over the peaked output edge 72 of the input tray 16, typically by lifting or pivoting the tray by handle 74, and/or manually feeding coins over the peak 72. The coins pass the gate (typically set to prevent passage of more than a predetermined number of stacked coins, such as by defining an opening equal to about 3.5 times a typical coin thickness). Instructions on the screen 32 may be used to tell the user to continue or discontinue feeding coins, can relay the status of the machine, the amount counted thus far, provide encouragement or advertising messages and the like. The coin rail 56 functions to receive coins output by the coin pickup assembly 54, and transports the coins in a singulated (one-at-a-time) fashion past the sensor 58 to the diverting door 62. Once no more coins are detected and/or in response to user input, the system determines that the transaction is complete and the computer 46 will send instructions to he printer 18 causing the printer to output a voucher of a type which may be exchanged for Hoods, services or cash.

Figure 2:
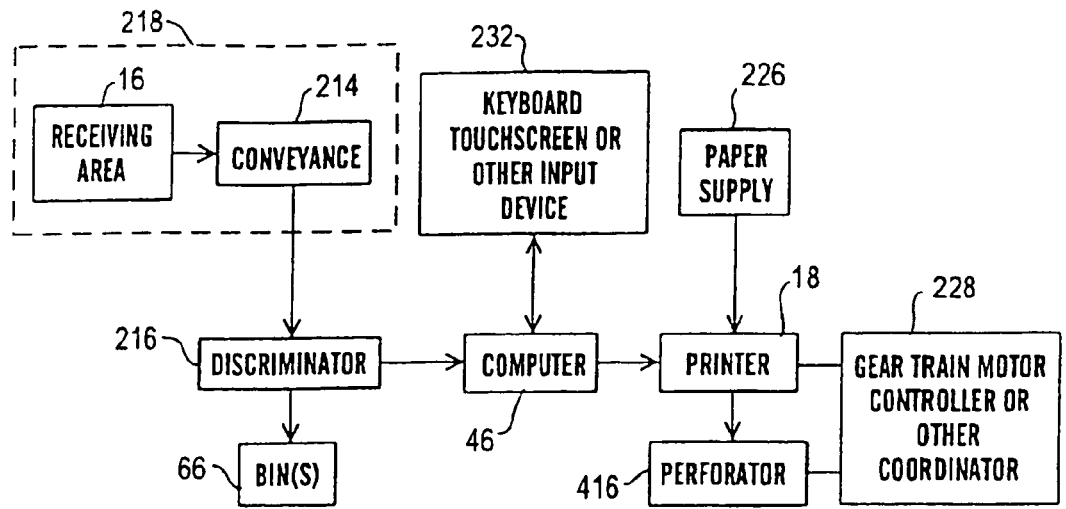
FIG. 2 is a block diagram depicting certain components of a coin discriminator of a type which can be used in accordance with implementation of the present invention.

FIG. 2 is a block diagram of a coin-discriminator of a type which can be used in accordance with implementations of the present invention. Some of the items in FIG. 2 correspond to components in the device of FIG. 1. In operation, an untrained user, such as a grocery store or other retail location customer places a plurality of coins of unknown value and random orientation in a receiving tray or other receiving area 16. Typically, foreign or other undesirable coins and foreign objects such as currency or other paper, paper clips, lint, keys and the like are mixed with the desired coins and placed, such as being poured or dumped, substantially all at once, into the tray 16. A conveyance device 214, such as a chute, trough, slide or the like, or including positive drive or otherwise moving conveyances such as conveyer belts, Archimedes' screws and the like, are used to provide at least some of the desired coins from the receiving area 16 to a coin-discriminator 218. Preferably, prior to entry to the discriminator 218, at least some of the foreign objects or materials are separated such as using airflow, vacuum, gravitational separation, size-based separation (such as through openings of predetermined size or sizes) and the like. The discriminator 216 provides a signal to a calculating device, preferably a computer with sufficient information regarding the number of desired coins of various denominations such that the computer 46 can output or store a value equal to or related to (such as being a predetermined amount or portion less than) the value of the desired discriminated coins which are then placed in one or more bins 66 or other receiving regions. The computer 46, at the end of a transaction (as indicated by lack of further input of coins for a predetermined period and/or input from a user) controls a paper voucher printer 18 to print, on paper (or other substrates) obtained from a roll of paper or other paper supply 226 a redeemable voucher for an amount related to the total value of the discriminated desired coins for this transaction.

FIGS. 3A and 3B depict a number of features of a voucher useful for avoiding, preventing and/or detecting unauthorized duplication or counterfeiting of vouchers. FIGS. 3A and 3B are presented herein in a fashion which indicates the relative positions of the indicia or marking on the front surface (FIG. 3A) and the opposite or rear surface (FIG. 3B). I.e., features which are shown as aligned in corresponding locations in FIGS. 3A and 3B are features which would appear at corresponding longitudinal positions on opposite surfaces of the voucher.

In the depicted embodiment, the rear surface (FIG. 3B) of the voucher includes printing 312 generally in the central region 314 of the rear surface. According to one embodiment of the invention, printing 312 is provided using an ink which, if copied using a conventional color photocopier, will result in a photocopy which is altered in appearance with respect to the original printing 312. In one embodiment, the printing 312 is in a fluorescent or metallic ink, preferably a fluorescent orange ink which, when photocopied, appears as a purple or maroon color rather than an orange color.

Although there may be several types of inks which do not readily photocopy, it is which is believed that many such inks cannot readily be applied to thermal paper. Examples of inks which can be used, and which have been found to be useful for application to thermal paper, include neon pink PMS 805, neon yellow PMS 803 and neon green PMS 802. It should be understood that these represent examples of inks which may be used but are not intended to be an exhaustive listing.

In the embodiment of FIG. 3, the rear surface of the voucher also contains printing 316, positioned on or relatively close (such as within about ¼ inch, preferably within 1/10th inch of) the voucher edge 318a, 318b. Preferably, the edge printing 316 is also provided in an ink which is not readily photocopied without an alteration in appearance. In one embodiment, the edge printing 316 is in a color different from that of the central printing 312 and, in one embodiment, is provided in fluorescent yellow ink. In the depicted embodiment the central printing 312 is in a first (e.g., lateral) orientation, and the edge printing 316 is in an orientation which is at an angle (e.g., 90°) to the first orientation (e.g., vertical).

As described more fully below, it is preferred that some or all anti-counterfeiting features described herein can be provided as pre-printing or pre-providing (i.e., can be provided on the paper stock or paper supply 226 before it is fed to the printer 18). This is particularly useful in connection with providing the edge printing 316 relatively close to the edges 318a, b since close-to-edge printing is a feature which is difficult to reproduce with many inkjet, laser or other computer based printers (which often require a minimum space, such as a space no less than about ¼ inch, between the paper edge and printing provided by such printer).

In the embodiment depicted in FIGS. 3A and 3B, certain visible features on the front and rear surfaces are registered, such that they occur in a predetermined spatial relationship on the front and rear surfaces. In the embodiment of FIGS. 3A and 3B, printed rectangles 324a, 324b on the rear surface are aligned with indicia (in this case, star logos) 326a,b,c,d on the front surface. Preferably the printing of the indicia 326a,b,c,d on the front surface is of such a nature that it is at least partially visible when viewing the rear surface, such as when the voucher is held up to the light or otherwise backlit in such a fashion that the indicia 326a, 326c appear to be registered within the box 324a when viewing the rear surface. Preferably, the registration is of a nature (such as providing for relatively close sizing and spacing of the logos 326 as compared to the boxes 324) such that even relatively small misregistration (i.e., in which the printing on the front surface is not precisely aligned with corresponding printing on the rear surface) is readily detectable by visual inspection. This feature is useful because it is relatively difficult to use photocopying, inkjet or laser printer technology for providing printing on two opposite surfaces of a page or paper such that the printing on the opposite surfaces are closely registered (e.g., within about ⅛ inches). Preferably, according to the present invention, such opposite-surface printing provides registration on the front and rear surfaces which are mix-registered in either a longitudinal or vertical direction by no more than about ⅛ inches, preferably no more than about, 1/16 inches and more preferably no more than about 1/32 inches.

In the embodiment of FIGS. 3A and 3B, a pattern of perforations 332 is visible on both surfaces of the voucher. When perforations are used for purposes such as facilitating tearing or separation of paper segments, such perforations are typically in straight lines or a series of straight line segments. According to an embodiment of the present invention, perforations are provided in a pattern which includes some portions which having a curved appearance (even though each individual perforation may itself be straight) such as depicted in FIGS. 3A and 3B. Such curved-pattern perforations are believed to be useful since they are readily visibly verified and relatively difficult for a counterfeiter to copy or reproduce. Preferably, the curved pattern includes portions 334 which have a relatively small radius of curvature such as radius of curvature of less than about ½ inch, preferably less than about ¼ inch. In one embodiment, the perforations are micro-perforations, such that each perforation has a length of about 0.4 mm, a width of about 0.01 mm, and an inter-perforation spacing of about 0.2 mm.

In one embodiment, regions or indicia are preprinted 342 using an ink or other substance which preferably is substantially non-apparent or invisible (such as having a color, reflectivity, texture and the like closely matching that of the unprinted paper), but which, when rubbed or scratched with the edge of a coin, will cause minute amounts of the coin to rub off and adhere only to the printed portion, leaving a visible mark (indicated in FIG. 3 by phantom lines 342). In one embodiment, such indicia are provided by printing using an ink which includes titanium oxide. Thus, it is typically difficult for a would-be counterfeiter to know which indicia should be printed in such non-visible ink since the indicia which are printed in a valid voucher are not readily apparent. However, the voucher may be relatively easily validated using only a ordinarily-available coin, i.e., without the use of special equipment.

Figure 4:
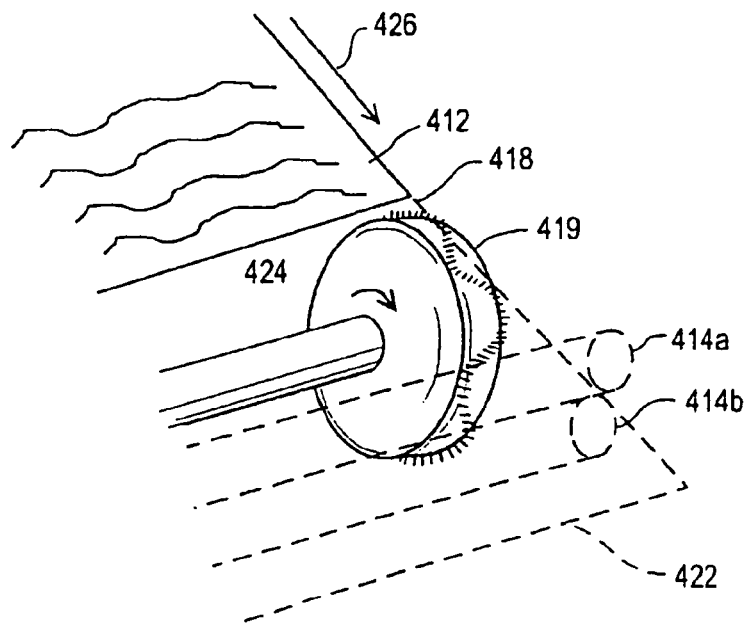
FIG. 4 is a partial perspective view of a perforation wheel according to an embodiment of the present invention.

Although it is possible to provide perforation of the type described as part of the paper stock 226, in one embodiment, the pattern of perforations is provided in conjunction with the process of printing the value of the voucher using the printer 224. As depicted in FIG. 4, in one embodiment as the paper, following the printing, leaves the printer 224, the paper moves from a first exit position 412 and is conveyed, e.g., by pinch rollers 414a, 414b across the edge of a perforating roller 416 whose edge has, radially protruding therefrom, a plurality of perforation-producing punches or spikes 418. As depicted in FIG. 4, the punches 418 are positioned on the edge of the roller 416 in a manner to produce the desired perforation pattern (in the depicted embodiment, in a sinusoidal or wavelike pattern corresponding to the pattern depicted in FIGS. 3A and 3B). The paper 412 is thus continuously perforated along its edge as it is conveyed toward a downstream position 422 and, eventually, dispensed to the user. In order to provide the proper rate of rotation 424 of the roller 416 as the paper is moved 426, the rate of rotation 424 of the roller 416 can be controlled and coordinated with the rate of paper movement 426 by a gear train, one or more motor controllers or other coordinator 228 in a manner that will be well known to those of skill in the art after understanding the present disclosure. The roller 416 can also be freewheeling, with rotation being driven by the paper movement. Although the perforation is described as occurring upon exit of the paper from the printer, the perforating wheel could also be positioned to provide perforation to the paper as it enters the printer or at other locations that will be apparent to those of skill in the art upon understanding the present disclosure.

Figure 5:
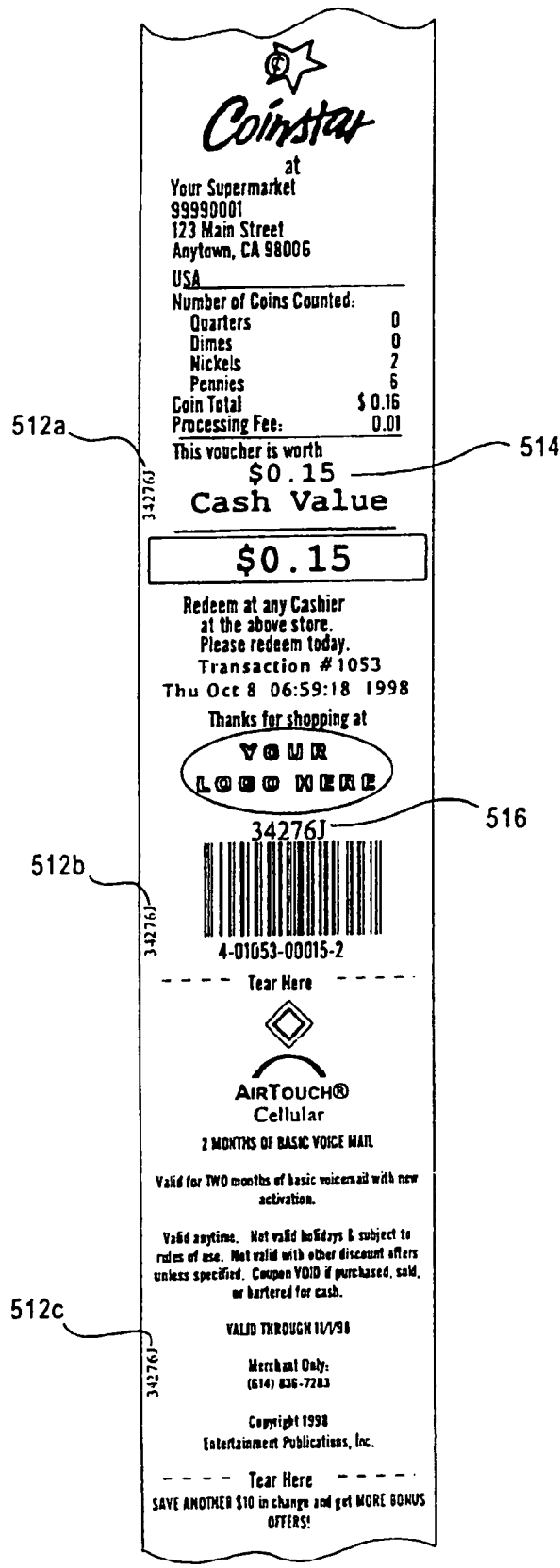
FIG. 5 is a front view of a voucher according to one embodiment of the present invention.

In one embodiment, some or all of a unit of the paper supply 226 (such as each roll of thermal paper) is associated with one or more serial numbers or other identifying numbers. In the embodiment of FIG. 5, the paper is preprinted, along the edge of the front surface, with such serial number or serial numbers. In the depicted embodiment, a single serial number associated with a roll of thermal paper and this number is printed at spaced intervals in a vertical fashion near an edge of the voucher, preferably within less than ¼ inch of the edge (similar to the manner described above in connection with the back surface edge printing 316 depicted in connection with FIG. 3B). In order to provide for ease of verifying the validity of the serial number, by the voucher redeemer, the serial number (or serial numbers) associated with the paper supply is also printed by the coin discriminator printer 18, e.g., substantially at the time the voucher value 514 is printed. In one embodiment, when service personnel load a roll of paper into the paper supply unit 226, such personnel also enter the serial number associated with the roll into the computer 46, e.g., using an I-O device such as a keyboard, touch screen, or similar device 232. In this way, the computer 46 has the information needed to control the printer 18 so as to print an identifier number 516 on the face of the voucher which will match the preprinted serial numbers 512 on the paper stock to permit the grocery store clerk or other redeemer to easily visually verify a match between the preprinted serial number 512 and the discriminator-printed serial number 516.

Although FIG. 5 depicts an embodiment in which a single serial number is associated with a unit of paper stock and is identically printed at intervals 512a, 512b, 512c, it is also possible to provide for identifying numbers which are preprinted on the paper stock, but which change along the length of a voucher or from one voucher to the next, such as incrementing by one or by some other number, or so as to change in some other manner (e.g., which is likely to be substantially unpredictable by a would-be counterfeiter). In this embodiment, it will be necessary for the computer 46 to be able to calculate or detect which preprinted serial number will be positioned near the area where the discriminator-printed number 516 will be printed so that the computer 46 can control the printer 18 to print a number 516 which will match the closest (or next preceding or succeeding) pre-printed serial number 512b. For example, the printer 18 may be configured to inform the computer 46 of the number of inches of thermal paper that has been thus-far dispensed from the roll. If it is known how the preprinted numbers 512 change along the length of the roll (such as incrementing by one for every inch of thermal paper dispensed) the computer 46 will have sufficient information to calculate, in a manner which will be well known to those of skill in the art after understanding the present disclosure, what number to print, using the printer 18, so as to match the closest or next succeeding or preceding preprinted number.

Figure 6:
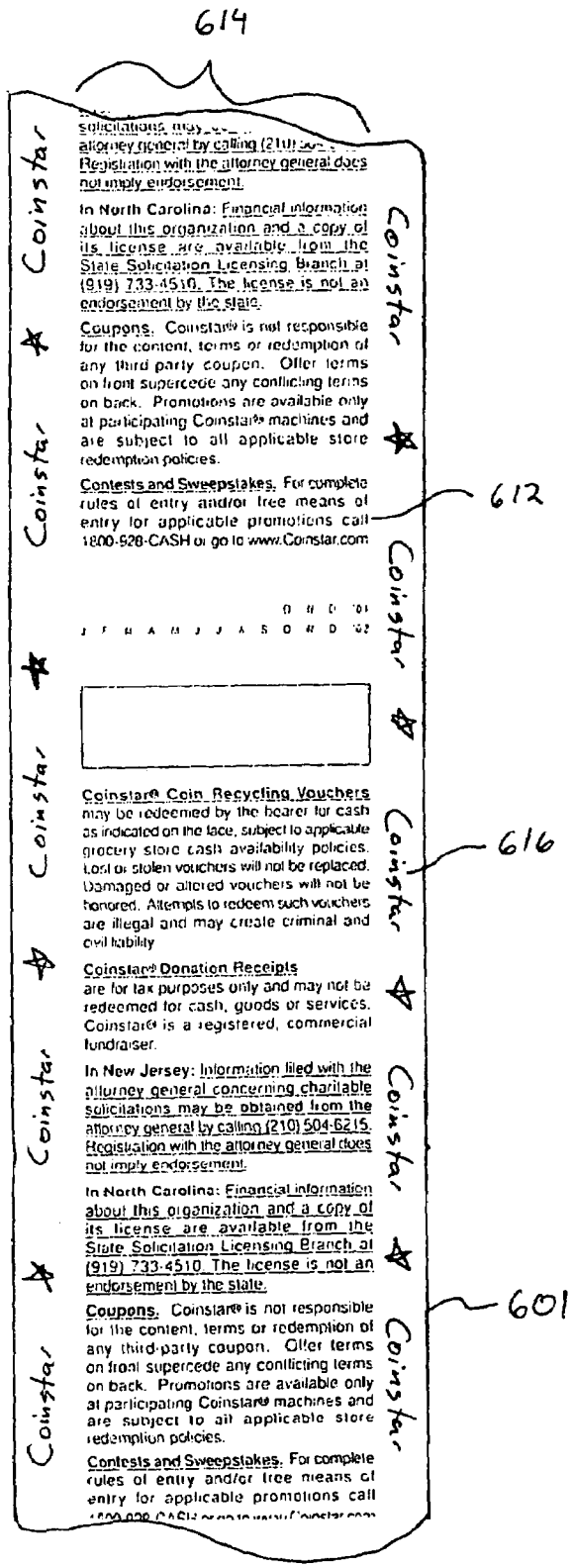
FIG. 6 is a view of a back surface of a voucher according to one embodiment of the present invention.

FIG. 6 depicts features of a voucher useful for avoiding, preventing and/or detecting unauthorized duplication or counterfeiting of vouchers in accordance with one embodiment of the invention. In the depicted embodiment, a substrate 201, such as a rear surface of a voucher, contains indicia, such as printing 616, that responds to changes in temperature. The printing 616 includes thermally responsive ink that becomes invisible when heated to or beyond an activation temperature. As used herein, the activation temperature is the lowest temperature at which the ink responds to heat. In one aspect of this embodiment, the printing 616 is vermillion, thermo-chromic ink with an activation temperature of approximately 85 degrees Fahrenheit. In other embodiments, other colors and types of thermally responsive indicia can be used. In another embodiment, the thermally responsive ink could be substantially invisible at room temperature and become visible when heated to or beyond an activation temperature. Furthermore, those of ordinary skill in the relevant art will appreciate that indicia with different activation temperatures can also be used in accordance with the disclosure.

One advantage of using thermally responsive indicia that has an activation temperature higher than typical room temperature and cooler than typical body surface temperature is that the indicia is thermally responsive to human touch. Accordingly, a person can breathe or touch the indicia for a few seconds and the indicia will respond, such as by becoming temporarily invisible.

In addition to using the thermally responsive printing 616, other thermally responsive indicia can be used on different areas of the voucher. For example, in the depicted embodiment the rear surface of the voucher includes printing 612 generally in the central region 614 that is oriented at an angle of approximately 90 degrees relative to the printing 616. Either some or all of the printing 612 can include thermally responsive indicia, such as thermally responsive ink. In addition, in other embodiments, a front surface of the voucher can also include thermally responsive indicia.

In another embodiment, thermally responsive ink can be placed on top of or proximate to other indicia, to camouflage the other indicia on the voucher. For example, in one embodiment black thermally responsive ink can be placed over text on a voucher. The black thermally responsive ink can be placed so that it renders the text unrecognizable to a viewer, such as a substantially solid block of black thermally responsive ink over the text. In this embodiment, when the thermally responsive ink is heated to the activation temperature, the thermally responsive ink disappears and the text becomes discernable to the viewer.

Thermally responsive indicia can be printed on a variety of substrates to provide voucher embodiments consistent with this disclosure. In one embodiment, for example, the thermally responsive ink is printed on 20-22 pound base paper with a brightness of 88.5% (minimum) and a thermal color of black trace. In other embodiments, other types of paper, including thermal paper, can be used.

In another embodiment, the substrate could change color in response to a change in temperature. For example, the substrate could be dark or opaque initially, and then change to white or a lighter color when heat is applied. A voucher incorporating this feature could include a thermally responsive substrate portion that is initially dark and located adjacent to other dark indicia to make the other dark indicia indiscernible. When heat is applied, the thermally responsive substrate portion changes to a lighter color, enabling the dark indicia to become discernable against the lighter background provided by the thermally responsive substrate. In an alternate embodiment, the thermally responsive substrate could be light-colored initially, and then change to a darker color when heat is applied. A voucher incorporating this feature could include a thermally responsive substrate portion that is initially light but configured to form the outline of indicia when heat is applied and it turns darker. When heat is applied to this voucher in the vicinity of the substrate, the thermally responsive substrate changes to a darker color, enabling the indicia to become discernable against the darker background provided by the thermally responsive substrate.

In the embodiment depicted in FIG. 6, the thermal indicia provides one of several means to authenticate the voucher. To authenticate the voucher, an individual, such as a cashier in a store, breathes on or touches the thermally responsive printing 616 for approximately 2-10 seconds. If the printing substantially disappears, the printing 616 on the voucher is authenticated. The individual can then proceed to authenticate the other anticounterfeiting features (discussed above) on the voucher.

In light of the above description, a number of advantages of the present invention can be seen. The present invention provides devices and procedures which facilitate reducing, eliminating, deterring and/or detecting attempts at unauthorized duplication and/or counterfeiting of vouchers. The present invention provides counterfeiting detection features which can be relatively readily implemented such as requiring little or no hardware and/or software modification, and, in some embodiments, requiring only the use of paper or paper stock having one or more of the features as described herein, and, in this manner, at least some features of the present invention can be retrofit, i.e., implemented readily in existing coin discriminators. The present invention provides at least some anti-counterfeiting or counterfeit detection features which use only, or primarily, visual inspection of the voucher and thus at least some features can be implemented without the need for modifying or adding hardware. At least some anti-counterfeiting or counterfeiting detection features can be performed relatively rapidly, such as verifying the correct color of various printing or indicia, correct positioning or registration, correct patterning or configuration of perforations and the like), preferably without requiring the redeemer to flip or rotate the voucher or otherwise manipulate the voucher, or enter data or otherwise handle the voucher (other than, e.g., to hold it up to ordinary light) such that at least some anti-counterfeiting or counterfeit detection features of the present invention can be implemented without substantial delay at a checkout lane. In some embodiments, certain features of the invention are not readily apparent upon visual inspection of a valid voucher and thus would-be counterfeiters may find it difficult to reproduce such features. For example, in one embodiment, at least some indicia are provided which fluoresce or have other visible characteristics only when exposed to ultraviolet or other special light. According to one embodiment, at least some indicia are provided which are substantially invisible until rubbed or scraped with a coin or similar object. Preferably in some embodiments the voucher is provided with features which are not readily reproduced or counterfeited without using devices or procedures which are typically not available to the general public. For example, perforations which are patterned in a curved, preferably tightly radiused pattern which preferably provides a periodic, smooth and/or repeating pattern and preferably is made using relatively small perforations are typically difficult to provide without special, not-readily-available, equipment.

A number of variations and modifications of the invention can also be used. It is possible to use some features of the invention without using others. For example, it is possible to use non-photocopying inks without using micro perforations, or it is possible to use front/back registered marks without using close-to-the-edge printing. Although the present invention has been described in connection with avoiding, preventing or detecting unauthorized duplication or counterfeiting of a coin-discriminator voucher, the present invention can also be used in connection with avoiding unauthorized duplication or counterfeiting of other items such as coupons, checks, tickets (such as airline, subway or other transportation tickets, game, performance, concert or other event tickets, and the like) negotiable instruments and the like. Although some features of the invention have been described as capable of implementation using a computer, it is possible to use other devices in place of a computer such as one or more application specific integrated circuits (ASIC's) hardwired Indoor discrete circuitry, and the like. Although embodiments relating to paper stock serial numbers were described as involving manual entry of serial numbers into the computer, it is also possible to provide for serial number entry by partially or fully automatic scanning or detection, such as using bar code scanners, magnetic ink detectors and the like. Although it is believed many other coin discriminators may involve the use of thermal printers, the present invention can be used in connection with many types of printers including laser printers, inkjet printers, dot matrix printers, line (impact) printers and the like. Although front/back surface registration of a pair of logos and a box was depicted, many shapes or symbols can be used for verifying registration. Although embodiments have been described which involve pre-printing or pre-providing certain items, it is also possible to use one or more printers housed in the coin discriminator device to print anti-counterfeiting items, such as printing in a fashion and/or with an ink which produces an altered appearance in a photocopy made therefrom.

Figure 7:
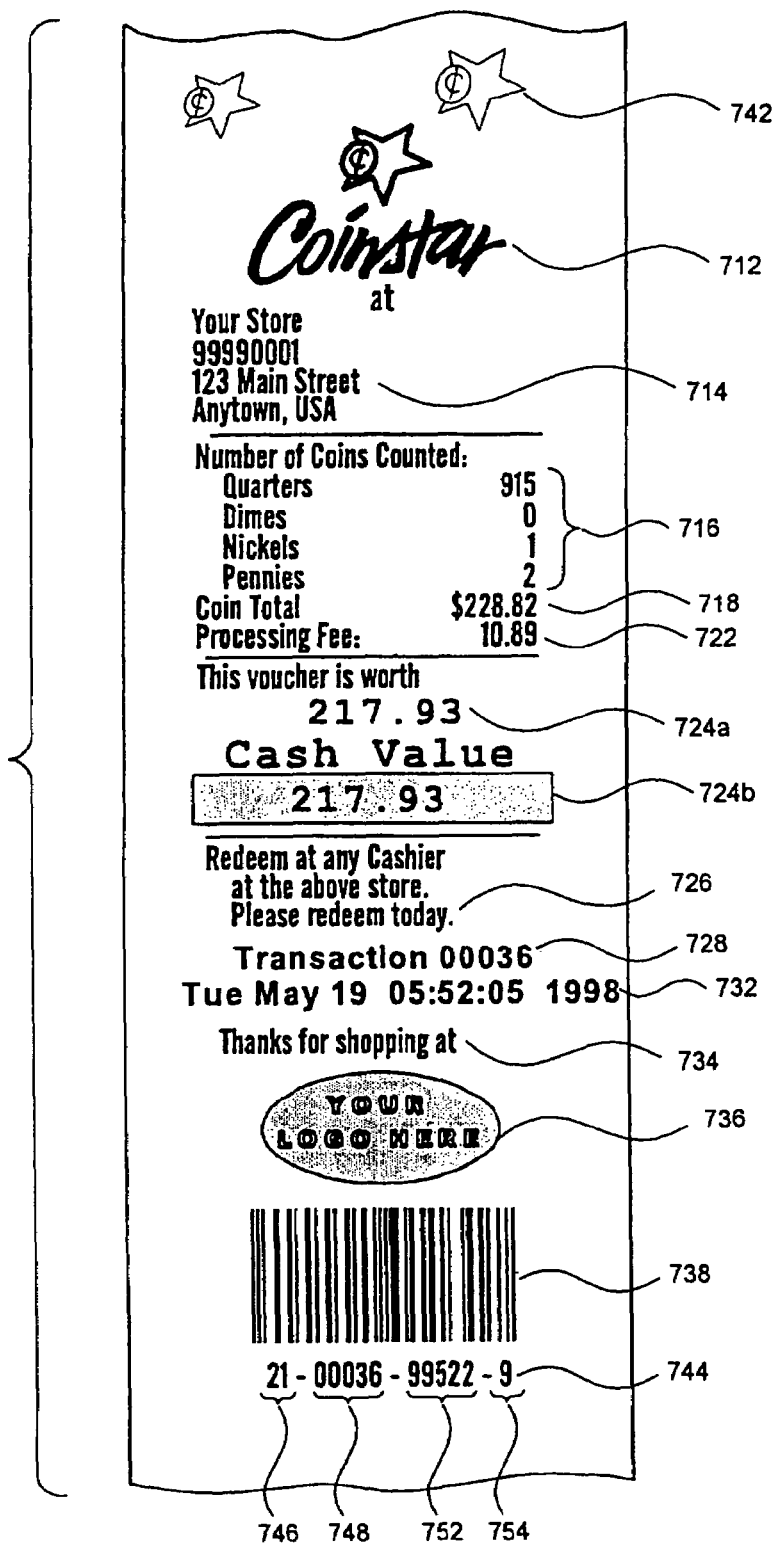
FIG. 7 depicts the appearance of a voucher of a type which may be used in accordance with an embodiment of the present invention.

FIG. 7 shows the appearance of a voucher of a type which may be used in connection with embodiments of the present invention. The present invention can be used with a number of types of paper or non-paper (such as electronic) vouchers. In the example of FIG. 7, the voucher is a paper voucher with a number of indicia printed thereon. Some of the indicia may be pre-printed (before a transaction occurs) or the entire voucher may be printed after coins are counted. In the depicted example, the voucher includes a coin discriminator or system logo or name 712, the name and address of the retail location where the discriminator is located 714, a tally of the number of various coin denominations counted 716, an indication of the total value of coins counted 718, an indication of the processing fee subtracted 722, the value of worth of the voucher 724a, b typically equal to the coin total 718 minus the processing fee 722, instructional information regarding how to redeem the voucher 726, a transaction number, a transaction date and time 732, a store message 734, a store or retail location logo 736 and a bar code 738. If desired, background printing 742 and/or microprinting and/or watermarking, encoded fibers and the like can be printed or provided as part of the paper or pre-printed, e.g., to assist in distinguishing counterfeit vouchers.

As is typical with bar codes, the bar code 738 is accompanied by a human readable, digital representation 744 of the number represented by the bar code 738. In the depicted embodiment, the 13-digit bar code 744 includes four fields— a two digit value indicative of the number system and type of item encoded (e.g., 2 equals random weight item, 3 equals National Drug Code, and the like) specified by the Uniform Code Council 746. A five-digit indication of the transaction number 748 (e.g., equal to item 728), a five-digit encrypted or encoded item 752 as described more thoroughly below and a check digit 754, calculated according to the Uniform Code Council rules (used, e.g., in verifying that the bar code is scanned correctly).

In one embodiment, the five-digit encrypted number 752 is an encryption of the voucher value 724a, b. Examples of possible encryption procedures are described below and numerous other types of encryption can be used. In any case, unless a potential counterfeiter knows how to properly encrypt the value, when a voucher with an altered voucher value 724a, b is presented, it is possible to use a verification procedure at the checkout stand to detect such alternation of the voucher by decrypting the encrypted value 752 and comparing to the value 724a, b printed on the face of the voucher. If only the value printed on the face of the voucher 724a, b is altered, without changing the encrypted value portion of the bar code 738 and/or the corresponding printed encrypted value 752, such alteration of the voucher value 724a, b can be detected. Similarly, if both the voucher value (unencrypted) 724a, b is altered and the encrypted value 752 is altered, but the alteration of the encrypted value does not provide, upon the decryption, a value equal to the unencrypted voucher 724a, b, again the attempted alteration can be detected.

Figure 8:
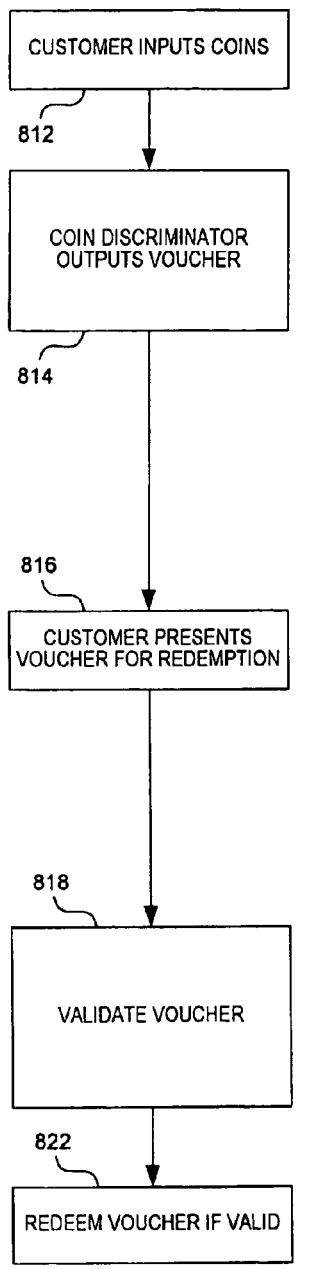
FIGS. 8A-C are flowcharts depicting voucher generation validation and redemption according to certain embodiments of the present invention.
Figure 11:
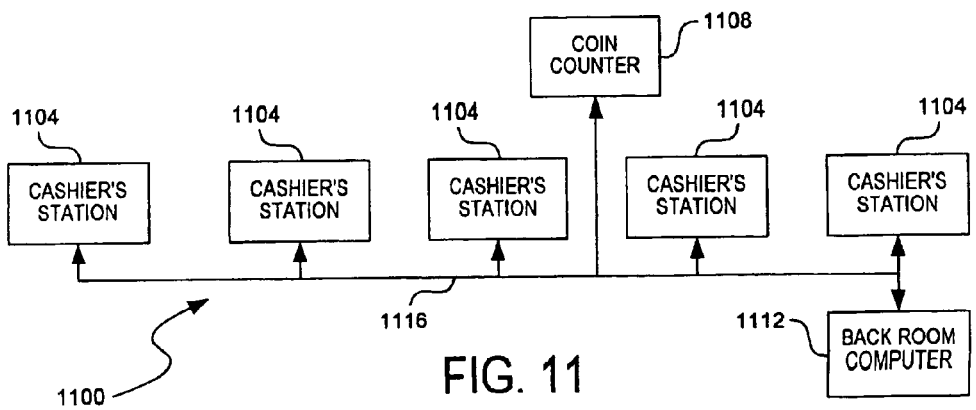
FIG. 11 depicts a store system including a coin discriminator of a type usable in connection with embodiments of the present invention.

FIG. 8A shows the process of using a voucher with an encrypted value for use in detecting voucher alterations. In the embodiment of FIG. 8A, a customer normally inputs coins 812, and the coin discriminator outputs a voucher 814, similar to that depicted in FIG. 7. At some point, the customer presents the voucher for redemption 816. In the embodiment of FIG. 8A, it is possible to validate the voucher 818 by using the encrypted voucher value 752 (FIG. 7). In this embodiment, in order to achieve a voucher validation, the encrypted number 752, is decrypted preferably by automatic or manual entry of the encrypted number 752 into a computer, such as a retail location checkout computer which, as depicted in FIG. 11, is preferably coupled to a retail location back room computer 1112 which contains decryption tables or other information or procedures for decrypting. If desired, it is possible to perform the step of validating the voucher 818 on only some presented vouchers, such as performing random or spot-checking of vouchers, checking only vouchers which are for an amount greater than a threshold amount, or which are older than a predetermined time or date.

The decrypted voucher value based on the encrypted value 752 is then compared, either automatically (e.g., by comparison in the point-of-purchase or back room computer) or manually (e.g., by displaying the decrypted amount which the clerk can visually compare with the value 724a, b printed on the voucher) in order to validate the voucher 818. Whereupon, if the voucher is valid, it is redeemed 822.

It is believed useful to base the altered or encrypted validation information at least partially on the voucher value, particularly since it is likely a voucher that has been altered will involve alteration of the value. However, it is also possible, in addition to or in place of using the voucher value, to use other numbers or information associated with the voucher such as a transaction number, date and time, store number or other identifier, a computer-generated unique (or pseudo-unique) key value, and the like. In configurations in which a customer number (or other identifier) is associated with a voucher (such as when the coin discriminator is configured to accept a "frequent-customer card," credit card, debit card or the like identifying a customer or to receive identification information input by the customer) the customer identification, preferably altered or encrypted, can be provided as part of the voucher information and used, e.g., to determine whether the person redeeming the voucher was the person who was identified on the voucher.

In the embodiment of FIG. 8B, the voucher is configured to include machine-readable information 814. By providing information in machine-readable form, it is possible to perform some or all steps involved in the voucher verification or redemption in an automatic fashion, e.g., without requiring keyboard or other manual output of voucher information. In the embodiment of FIG. 8B, the machine-readable information is read 824 after the customer presents the voucher for redemption, and preferably, the machine-readable information is used during the validation 818 or redemption 822.

In procedures 8A and 8B, there is no need for the coin counter 1108 (FIG. 11) to be coupled to the back room computer or cashier's station, i.e., the coin counter 1108 can be a "standalone" device. In the embodiment of FIG. 8C, the coin counter or discriminator 1108 is coupled by communication link to the retail location back room computer 1112 as depicted in FIG. 11. The coin discriminator sends electronic information to the backroom computer 826 which includes information that can be used during a validation step. The information to be used in a valid step can include many of the types of information depicted in FIG. 7 including the unencrypted value 724a, b, the encrypted value 752, the transaction number 728, the time date 732, the store identification information 714 and the like. In the embodiment of FIG. 8C, validation can include comparing information printed or encoded on the voucher with the information that was transmitted to the back room computer. For example, alterations in the unencoded value 724a, b can be automatically detected by comparing 828 a voucher value indicated by or encrypted in the bar code 738 with the value stored in the back room computer 1112 corresponding to the particular transaction number or time if the voucher.

Figure 9:
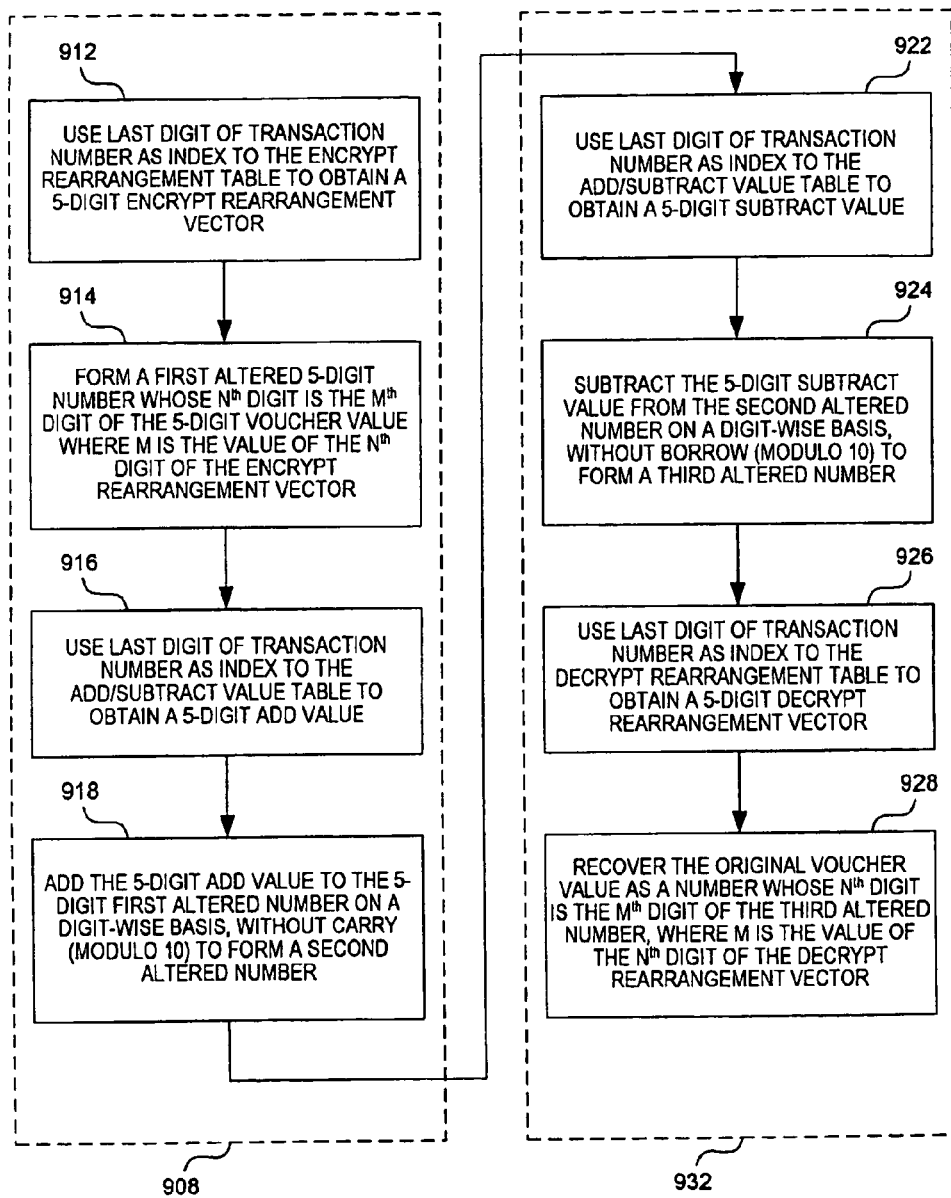
FIG. 9 is a flowchart depicting a transaction number/value manipulation procedure according to an embodiment of the present invention.

FIG. 9 depicts one method for encrypting a voucher value 724a, b. The example of FIG. 9 related to a voucher having a maximum of five decimal digits (i.e. a voucher with a value no greater than $999.99). In some configurations, vouchers having a value greater than the maximum encodable or encryptable value (in the example $1,000 or more) can be provided with a special encryption code (e.g. 0) requiring, e.g., manual verification or validation of a voucher.

In the example of FIG. 9, first and second tables are provided, giving numerous possible encryption values for use in encrypting. Tables I and II below provide examples of such tables.

TABLE I (rearrangement table)

| Last Digit | Key |
|---|---|
| 0 | 32541 |
| 1 | 51432 |
| 2 | 42153 |
| 3 | 25341 |
| 4 | 14352 |
| 5 | 24513 |
| 6 | 31452 |
| 7 | 14253 |
| 8 | 51423 |
| 9 | 25134 |

TABLE II (encryption key)

| Last Digit | Key |
|---|---|
| 0 | 95175 |
| 1 | 36987 |
| 2 | 24789 |
| 3 | 12547 |
| 4 | 63257 |
| 5 | 58214 |
| 6 | 27691 |
| 7 | 35896 |
| 8 | 12345 |
| 9 | 85214 |

In these examples, there are 10 possible values that may be used, and accordingly, a table index having 10 possible values is appropriate. In the example of FIG. 9, the last digit of the transaction number is employed as the table index value. Accordingly, the last digit of the transaction number 728 (FIG. 7) is used as an index to the rearrangement table (Table I) to obtain a five-digit encrypt rearrangement vector 912. In the example of FIG. 7, the last digit of a transaction number 728 is 6, and accordingly, the encrypt rearrangement vector to be used, as shown in table I, is "31452". The vector is used to form a first altered five-digit number whose Nth digit is the Mth digit of the five-digit voucher value 724a where M is the value of the Nth digit of the encrypt rearrangement vector 914. In the present example, the first altered five-digit number would thus be 72931. Note that this value is the five digits of the voucher value 724a with the digits rearranged so that the first digit of the first altered number is the third digit of the voucher value, the second digit of the first altered number is the digit of the voucher value, the third digit of the altered number is the fourth digit of the voucher value, the fourth digit of the first altered number is the fifth digit of the voucher value, and the fifth digit of the first altered number is the second digit if the voucher value, in accordance with the rearrangement vector 31452.

According to the procedure of FIG. 9, a second encryption step, using Table II is then applied. Again, the last digit of the transaction number ("6" in the present example) is used as an index to the add/subtract value table (Table II) to obtain a five-digit add value, namely 27691. Each digit of the add value is separately added to the corresponding digit of the first altered number (i.e., digit-wise addition) without any carry (i.e., using modulo 10 addition) resulting in a second altered number. In the present example, digit-wise, modulo 10 addition of 27691 plus 72931 yields the five-digit number 99522, which is then the number printed on the voucher 752 as depicted in FIG. 7. Accordingly, steps 412 through 918 result in an encryption procedure 908 which may be performed in the coin counter computer 1108 or a coupled computer such as a back room computer 1112.

When the voucher of FIG. 7 is presented for redemption, preferably the bar code 738 is scanned, and the five-digit encoded value 752 is used for validation purposes. To perform the validation 932, the last digit of the transaction number 728 ("6" in the present example) is used as an index to the add/subtract value table (Table II) which is stored in or available to the computer at the cashier station 1104 where the voucher is presented. Because the decryption process involves reversing the addition step (i.e., subtracting the same number that was previously added) the add/subtract value table used for decryption purposes can be identical to that used (Table II) for encryption. In this case, using the last digit of the transaction number ("6") as an index to the add/subtract value table yields 922 a five-digit subtract value, in this case 27691. The five-digit subtract value is then subtracted from the second altered number (i.e., in the present example, subtracted from 99522) on a digit-wise basis without borrow (i.e., using modulo 10 arithmetic) to form a third altered number 924 which, in this case, yields the number 72931. Again, the last digit of the transacting number ("6") 728 is used as an index to a decrypt table to obtain a five-digit decrypt rearrangement vector (which, in this example, is 25134) 926. Although, to provide for relatively rapid computational speed, it is preferred to store a decrypt table, it is also possible to derive or compute the proper decrypt rearrangement vector from the corresponding encrypt rearrangement vector. In the present example, the Mth digit of the decrypt rearrangement vector will be equal to P where P is the ordinal number (counting left to right) of that digit of the corresponding encrypt rearrangement vector which equals M. The decrypt rearrangement vector is used to recover the original vector or voucher value 724 as a number whose Nth digit is the Nth digit of the third altered number, where M is the value of the Nth digit of the decrypt rearrangement vector 928.

Figure 10:
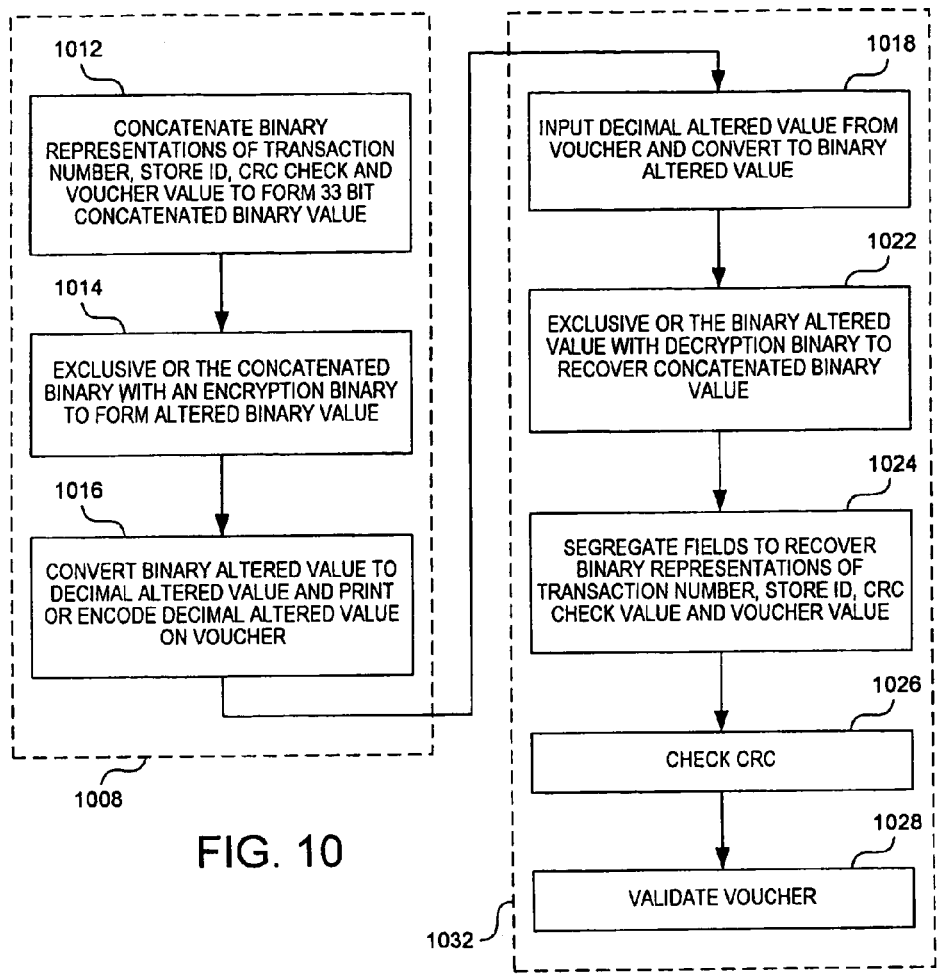
FIG. 10 depicts a transaction number/value manipulation procedure according to an embodiment of the present invention.

FIG. 10 depicts another decryption scheme that can be used to encrypt and decrypt voucher information. In the example of FIG. 10, binary representations of voucher information, in this case, binary representations of a transaction number, store ID number, cyclic redundancy check (CRC) number and voucher value are concatenated to form, in this example, a 33-bit concatenated binary value 1012. This concatenated binary value is exclusive ORed with an encryption binary value to form a 33-bit altered binary value 1014. The encryption binary value can be any of a number of binary numbers, provided the encryption binary number is also available during the decryption process. In one embodiment, the encryption binary value is based on the store identification number (since this will be available to the store computer upon an attempted redemption). The 33-bit altered binary value is then converted to a decimal altered value using normal binary-to-decimal conversion resulting in, e.g., a ten-digit decimal value which is then printed or encoded on the voucher 1016. The encryption procedure 1008 can be performed in the coin counter 1108 or the coupled back room computer 1112. When the voucher is presented for redemption, the decimal altered value from the voucher is input (either manually, e.g., using the keyboard, or automatically, e.g., by scanning a bar code) and the decimal value is converted to a binary altered value such as a 33-bit binary altered value 1018.

The binary altered value thus obtained is exclusive ORed by the decryption binary value (such as decryption binary value based on the store identification number in the example described above) to recover the concatenated binary value 1022. As noted above, the concatenated binary value contains fields having binary representations of the transaction number, store ID, CRC, and voucher values (e.g.). Accordingly, these binary fields may be segregated 1024, and the various values may be used for validation and similar purposes such as performing data integrity checks (such as checking the CRC 1026) and/or validating the voucher using, e.g., the decoded voucher value in a fashion similar to that described above 1028. If desired, the CRC can be used to verify a successful conversion, thus facilitating the use of multiple conversions, e.g., over a time period. For example, it is possible to use the month-of-issue of the voucher to perform a look-up in the transposition table, or as part of the binary encryption key. It is also possible to use the store number as all or part of the encryption key, e.g., to aid detection of cross-shopper redemption attempts.

The format of the voucher and/or format or standards for bar code can impose restraints or limits on the number of digits available for various pieces of information. For example, according to one bar code standard, a total of ten decimal digits may be available for encoding information at the discretion of the voucher designer. For example, in the configuration of FIG. 7, ten decimal digits (748 and 752) are free to be provided by the coin discriminator. The manner in which these digits are assigned to various fields will determine the range of values available for those fields. For example, in the configuration of FIG. 7, five decimal digits are designated for expressing the voucher value so that the maximum voucher value that can be encoded under this system would be $999.99.

In the embodiment of FIG. 10, if it is assumed that ten decimal digits are available for conveying the encrypted binary value, this essentially means that the maximum number of binary bits available to hold the various (concatenated) binary fields will be 33 (since the maximum number encoded by 34 bits ($2^{34}$) would require at least 11 digits (log2 (999,999,999)=32)). In this case, the manner in which the 33 available binary digits are distributed among the various fields determines the maximum value or range for that field. For example, if 16 of the 33 bits are used for holding the binary equivalent of the voucher value, the maximum voucher value that can be indicated will be $655.35 ($2^{16}-1=65,535$). Accordingly, if the scheme of FIG. 10 is to be used in connection with a bar-coded value provided in accordance with Uniform Code Council standards, the binary field sizes should be judiciously selected to provide the desired or necessary ranges for various items. In one embodiment, in addition to the bits provided for the voucher value, seven bits are used for the transaction number (providing a range of 0-128, decimal) 5 bits provided for the store ID number (providing a range of 0-32, decimal) and 5 bits for a CRC check value. Although this scheme provides a smaller range for the transaction number than the range of the configuration of FIG. 7 (which provides five decimal digits for the transaction number) it is believed that in some situations, a relatively smaller transaction value range will be acceptable, particularly if the transaction number can be combined with other information such as store location and/or date/time. By using binary fields for encoding voucher information as described in connection with FIG. 10 regardless of their correspondence to various decimal digits, it can become possible to encode a relatively large number of different types of fields or information.

In light of the above description, a number of advantages of the present invention can be seen, only some of which are noted herein. For example, the present invention provides a way to detect at least some forms of voucher counterfeiting, alterations, duplication, fabrication, and the like, e.g., by including encoded or encrypted voucher information which cannot be readily replicated and/or using encryption/decryption schemes which are relatively resistant to being broken. Preferably the encryption or encoding can be accomplished without requiring, for their decryption, time or computing resources beyond those available in normal retail transactions or facilities. The present invention is able to provide detection of voucher alterations, duplications and the like in a manner which is partially or fully automated so that time or manpower investments need not be made in manually entering data or validating or redeeming vouchers. Embodiments of the present invention can be implemented in a fashion consistent with standard retail establishment procedures or equipment such as in a fashion consistent with Uniform Code Council bar code or other standards, preferably in a manner such that the same scanning hardware and/or software used for normal retail procedures such as checkout procedures can be used in implementing embodiments of the present invention substantially with little or no modification, e.g., requiring only data needed to recognize particular types of bar codes and to branch to voucher verification, redemption, or other voucher handling routines. The procedures used in the encryption 908 and decryption 932 of the procedure of FIG. 9 involve processes which are, for typical computing devices, relatively rapid in terms of execution time, such as table lookup procedures, add/subtract procedures, and digit shift and rearrangement procedures. Accordingly, it is believed that one of the potential advantages of a procedure similar to that depicted in FIG. 9 is that it can be implemented on cashier station computers 1004 in existing configurations which may have relatively low-powered computers such as those based on 80286 processors. In this way, it is believed feasible to implement the present invention without imposing significant additional wait or processing time to achieve voucher validation or redemption.

It is believed that the difficulty of breaking an encryption code according to the present invention is especially high in the case of coin counter vouchers since legitimate coin counter vouchers typically tend to have a relatively small range of values (i.e., few legitimate vouchers with values greater than a few tens of dollars would typically be available to a putative counterfeiter). In general, the smaller the range of encrypted data available to a code-breaker, the more difficult it is to break the code. A number of variations and modifications of the invention can be used. Although features of the present invention are described in connection with an example in which a voucher is a printed voucher (e.g., magnetic cards, electronic transfers and the like), some or all features of the present invention can be used in connection with at least some other types of vouchers (e.g., magnetic cards, electronic transfers and the like), as will be apparent to those of skill in the art after understanding the present disclosure.

Although particular encryption or alteration schemes have been described and are believed to be particularly useful especially in those situations in which computational time or power available for decryption and/or validation are limited, other encryption/decryption schemes can be used, including those generally known for data encryption such as RAS, DES, public/private key systems, and the like. Although an encryption system has been described which involves the step of adding and a step of rearranging, numerous alterations and variations are possible such as performing the steps in a different order, interchanging addition and subtraction, using normal rather than modulo addition or subtraction (where sufficient digits are available), 1's complement and multiple keys. Although indexing to encryption value tables was described in connection with using a particular digit of transaction number as an index, it is possible to use different indices for the different tables (Tables I and II), or other indices can be used, including other digits of a transaction number, hashes or other modifications of a transaction number or digits thereof, other information in place of or combined with the transaction number (or digits thereof) such as the transaction date, time, location code, customer identification and the like.

Preferably, in addition to or in place of, validating by comparing a decrypted voucher value with a printed (unencrypted) voucher value, a "negative check file" test is performed to identify vouchers which correspond to vouchers which have already been redeemed or may otherwise be suspect. For example, the negative check file may include transaction numbers, date-time information or other voucher identification information for previously redeemed vouchers at a particular store or vouchers redeemed within a certain interval of time, voucher identifiers known to be associated with vouchers previously altered or fabricated, or the like.

Although examples described herein include encoding of all digits of a voucher value, it is possible to configure voucher validation procedures which provide encoding or encryption of only some digits of the value (or other field), such as a certain number of least significant or most significant digits, odd-numbered digits and the like. In these configurations, encoded selected voucher value digits cannot be used to, by themselves, indicate the value of the voucher, and accordingly, the full voucher value would need to be provided in another form such as being provided in a different field of the bar code, provided in a different region of the voucher, provided to the cashier computer through another route (e.g., by being sent from the coin counter to the back room computer and then to the cashier computer when the voucher is presented for redemption).

In one embodiment, rather than performing a specific voucher validation step, it is possible to achieve many of the same benefits by always encoding or encrypting the voucher value and always redeeming a voucher in an amount equal to the value indicated by the decrypted voucher value, on the assumption that those attempting to alter the unencrypted value indicator 724a, b will fail to realize that the redemption will be based on decryption of an encrypted value (and thus will fail to alter the encryption value) and/or will fail to understand how to alter the encrypted value (will fail to understand the encryption procedure) in such a way as to consistently achieve a goal of increasing a voucher value in a manner likely to escape notice. Although it is preferred to use a programmable computer for encrypting, decrypting and/or validating, it is possible to use other devices such as hand-wired logic devices, programmable logic arrays, application-specific integrated circuits and the like.

Although the present invention has been described in connection with a coin discriminator, it can be used in other contexts such as providing encoded, encrypted or other altered information on printed or electronic coupons, tickets, gaming items or tokens, passes, checks, product or service bar codes, or other documents or communications, including electronic communications. Those of skill in the art will, after understanding the present disclosure, know how to provide hardware and software for implementing, making and using the invention. It is intended the appended claims be construed to include alternative embodiments to the extent permitted.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and/or reducing cost of implementation.

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

The invention claimed is:

1. A method for providing a substrate in a coin discriminator having a discriminator printer, the method comprising:
   providing a first indicia on a first surface of a substrate, wherein the first indicia has an altered appearance when photocopied;
   providing a second indicia on a second surface of the substrate;
   providing a third indicia on the first surface of the substrate, wherein the third indicia on the first surface is visibly registered with the second indicia on the second surface when the substrate is visually inspected from the second surface;
   providing a preprinted serial number on the first surface of the substrate; and
   printing a discriminator-printed number on the first surface of the substrate with the discriminator printer, wherein the discriminator-printed number is positioned proximate to the preprinted serial number, and wherein the discriminator-printed number matches the preprinted serial number.

2. The method of claim 1 wherein providing the substrate with a first indicia includes providing the substrate with fluorescent ink.

3. The method of claim 1 wherein providing the substrate with a first indicia includes providing the substrate with a metallic ink.

4. The method of claim 1 wherein providing a substrate with a first indicia includes providing a substrate with a neon-colored ink.

5. The method of claim 1 wherein providing a third indicia on the first surface of the substrate includes providing a third indicia that is visibly aligned with the second indicia on the second surface when the substrate is visually inspected from the second surface.

6. The method of claim 1 wherein providing a second indicia on a second surface of the substrate includes providing an enclosed geometric shape, and wherein providing a third indicia on the first surface of the substrate includes providing a third indicia that is positioned within the enclosed geometric shape when the substrate is visually inspected from the second surface.

7. The method of claim 1 wherein providing a second indicia on a second surface of the substrate includes providing a box shape, and wherein providing a third indicia on the first surface of the substrate includes providing a third indicia that is positioned within the box shape when the substrate is visually inspected from the second surface.

8. The method of claim 1 wherein providing a third indicia on the first surface includes printing the third indicia at an angle of between 70 and 110 degrees relative to the second indicia.

9. The method of claim 1 wherein providing a third indicia on the first surface includes printing the third indicia at an angle of approximately 90 degrees relative to the second indicia.

10. The method of claim 1, further comprising using the discriminator printer to print, on the substrate, at least a fourth indicia containing an indication of a value of the substrate.

11. The method of claim 1, further comprising:
   encrypting a value; and
   printing the encrypted value on the substrate.

12. The method of claim 1, further comprising:
   determining a value related to a total of coins counted;
   encrypting the value;
   printing the encrypted value on the substrate;
   dispensing the substrate;
   decrypting the encrypted value; and
   redeeming the substrate for at least one of cash and merchandize up to the value.

13. The method of claim 1 further comprising:
   encrypting transaction-identifying information; and
   printing the encrypted transaction-identifying information on the substrate.

14. The method of claim 13 wherein the encrypted transaction-identifying information includes a transaction time.

15. The method of claim 1 wherein the preprinted serial number is a first preprinted serial number, wherein the discriminator-printed number is a first discriminator-printed number, and wherein the method further comprises:
 providing a second preprinted serial number on the first surface of the substrate, wherein the second preprinted serial number is different than the first preprinted serial number; and
 printing a second discriminator-printed number on the first surface of the substrate with the discriminator printer proximate to the second preprinted serial number, wherein the second discriminator-printed number matches the second preprinted serial number.

16. The method of claim 1, further comprising:
 determining a value related to a total of coins counted;
 encrypting the value by permuting the digit order of a number that includes the value with a permutation vector to provide a first permuted number;
 printing the encrypted value on the substrate;
 dispensing the substrate;
 decrypting the encrypted value; and
 redeeming the substrate for at least one of cash and merchandize up to the value.

17. The method of claim 16 wherein encrypting the value further includes adding a selected number to the first permuted number.

18. The method of claim 16, further comprising selecting the permutation vector based at least in part on a portion of a transaction number printed on the substrate.

19. A substrate for use with a coin discriminator having a discriminator printer, the substrate comprising:
 a first indicia on a first surface, wherein the first indicia has an altered appearance when photocopied;
 a second indicia on a second surface of the substrate;
 a third indicia on the first surface of the substrate, wherein the third indicia on the first surface is visibly registered with the second indicia on the second surface when the substrate is visually inspected from the second surface;
 a preprinted serial number on the first surface of the substrate; and
 a discriminator-printed number on the first surface of the substrate proximate to the preprinted serial number, wherein the discriminator-printed number matches the preprinted serial number.

20. The substrate of claim 19 wherein the first indicia is preprinted on the substrate prior to use with the discriminator printer.

21. The substrate of claim 19 wherein the first, second, and third indicia are preprinted on the substrate prior to use with the discriminator printer.

22. The substrate of claim 19 wherein the first indicia includes fluorescent ink.

23. The substrate of claim 19 wherein the first indicia includes metallic ink.

24. The substrate of claim 19, wherein the first indicia includes neon-colored ink.

25. The substrate of claim 19 wherein the third indicia on the first surface is visibly aligned with the second indicia on the second surface when the substrate is visually inspected from the second surface.

26. The substrate of claim 19 wherein the third indicia on the first surface is positioned within the second indicia on the second surface when the substrate is visually inspected from the second surface.

27. The substrate of claim 19 wherein the second indicia on the second surface includes a box shape, and wherein the third indicia on the first surface is positioned within the box shape when the substrate is visually inspected from the second surface.

28. The substrate of claim 19 wherein the third indicia on the first surface is printed at an angle of between 70 and 110 degrees relative to the second indicia.

29. The substrate of claim 19 wherein the third indicia on the first surface is printed at an angle of approximately 90 degrees relative to the second indicia.

30. The substrate of claim 19, further comprising a fourth indicia containing an indication of a value of the substrate, wherein the fourth indicia is printed on the substrate by the discriminator printer.

31. The substrate of claim 19, further comprising:
 an unaltered version of a value relating to a total of coins counted; and
 an encrypted version of the value.

32. The substrate of claim 19, further comprising encrypted information relating to a coin counting transaction, wherein the encrypted information is machine-readable.

* * * * *

UNITED STATES PATENT AND TRADEMARK OFFICE
CERTIFICATE OF CORRECTION

PATENT NO. : 7,464,868 B2  Page 1 of 1
APPLICATION NO. : 10/894358
DATED : December 16, 2008
INVENTOR(S) : Brown et al.

It is certified that error appears in the above-identified patent and that said Letters Patent is hereby corrected as shown below:

Title page Item (63), after "abandoned" insert -- , which is a divisional of application No. 10/039,181, filed on Jan. 5, 2002, now Pat. No. 6,644,696, which is a continuation-in-part of application No. 09/422,917, filed Oct. 21, 1999, now Pat. No. 6,349,972. --

Title page insert Item (60) -- Provisional application No. 60/105,508, filed on Oct. 23, 1998. --

In column 6, line 38, delete "digi" and insert -- digit --, therefor.

In column 7, line 23, after "is" insert -- a --.

In column 16, line 8, after "time" insert -- and --.

In column 16, line 19, delete "related" and insert -- relates --, therefor.

In column 16, line 23, delete "(in the example" and insert -- (in this example, --, therefor.

In column 16, line 66, after "the" insert -- encrypt --.

In column 17, line 3, delete "table I" and insert -- Table I --, therefor.

In column 17, line 12, delete "the digit" and insert -- the first digit --, therefor.

In column 17, line 16, delete "if" and insert -- of --, therefor.

Signed and Sealed this

Twenty-fourth Day of March, 2009

JOHN DOLL
*Acting Director of the United States Patent and Trademark Office*